(12) United States Patent
Rocklin et al.

(10) Patent No.: US 11,310,462 B2
(45) Date of Patent: Apr. 19, 2022

(54) USER ENGAGEMENT COMPUTER SYSTEM AND METHOD OF USING SAME

(71) Applicant: Mado Labs, Inc., Brooklyn, NY (US)

(72) Inventors: William Rocklin, Brooklyn, NY (US); Rembert Reynolds, Brooklyn, NY (US); Rei Inamoto, Brooklyn, NY (US); Tucker Charles Schoos, Brooklyn, NY (US); Nathalie Gina Torres, Brooklyn, NY (US); Robert Cecil Dickerson, Columbia, MO (US); William Turnage, Brooklyn, NY (US); Fumiaki Yoshimatsu, New York, NY (US); Chelsea Garber, Brooklyn, NY (US)

(73) Assignee: Mado Labs, Inc., Brooklyn, NY (US)

( * ) Notice: Subject to any disclaimer, the term of this patent is extended or adjusted under 35 U.S.C. 154(b) by 0 days.

(21) Appl. No.: 16/948,552

(22) Filed: Sep. 23, 2020

(65) Prior Publication Data

US 2021/0014452 A1 Jan. 14, 2021

Related U.S. Application Data

(62) Division of application No. 16/237,882, filed on Jan. 2, 2019, now Pat. No. 10,855,952.

(Continued)

(51) Int. Cl.
*H04N 7/14* (2006.01)
*H04L 65/401* (2022.01)
(Continued)

(52) U.S. Cl.
CPC ............. *H04N 7/147* (2013.01); *G06F 3/017* (2013.01); *G10L 15/22* (2013.01);
(Continued)

(58) Field of Classification Search
USPC ...................................................... 348/14.03
See application file for complete search history.

(56) References Cited

U.S. PATENT DOCUMENTS

| 2012/0038550 A1* | 2/2012 | Lemmey ................. A63F 13/42 345/156 |
| 2014/0007257 A1 | 1/2014 | Dougherty et al. |

(Continued)

*Primary Examiner* — Amal S Zenati
(74) *Attorney, Agent, or Firm* — Amster, Rothstein & Ebenstein LLP

(57) ABSTRACT

A user engagement computer system for enhancing user engagement via video chats and methods of using same are disclosed. The system includes one or more modules that provide enhanced video chat features such as one of the following: detecting user presence at the user devices, automating the establishment and/or scheduling of video chat sessions based on user presence, controlling the available functionality of the video chat application during a video chat session based on user presence, providing a kids mode with safeguards for children who video chat, providing visualization of storytelling, providing shared digital interactions via a shared interactive digital screen overlaid onto the video chat display, providing user controls via unspoken words, motions and gestures, actively measuring user engagement during a video chat session, and utilizing state machines to dynamically change between system states.

4 Claims, 19 Drawing Sheets

Related U.S. Application Data

(60) Provisional application No. 62/625,617, filed on Feb. 2, 2018.

(51) Int. Cl.
  *G06F 3/01* (2006.01)
  *G10L 15/22* (2006.01)
  *H04L 65/1089* (2022.01)
  *G06F 3/0488* (2022.01)

(52) U.S. Cl.
  CPC ...... *H04L 65/1089* (2013.01); *H04L 65/4015* (2013.01); *G06F 3/0488* (2013.01)

(56) References Cited

U.S. PATENT DOCUMENTS

| | | |
|---|---|---|
| 2014/0164532 A1 | 6/2014 | Lynch et al. |
| 2014/0192140 A1* | 7/2014 | Peevers ................ A63F 13/61 |
| | | 348/14.08 |
| 2016/0335532 A1 | 11/2016 | Sanghavi et al. |
| 2017/0131971 A1 | 5/2017 | Mitchell et al. |
| 2019/0189117 A1 | 6/2019 | Kumar |

* cited by examiner

USER ENGAGEMENT COMPUTER SYSTEM AND METHOD OF USING SAME

CROSS REFERENCE TO RELATED APPLICATIONS

This application is a divisional of U.S. patent application Ser. No. 16/237,882, filed Jan. 2, 2019 and entitled "USER ENGAGEMENT COMPUTER SYSTEM AND METHOD OF USING SAME", which claims the benefit under 35 U.S.C. § 119(e) of U.S. Provisional Patent Application Ser. No. 62/625,617, filed on Feb. 2, 2018 and entitled "USER ENGAGEMENT COMPUTER SYSTEM AND METHOD OF USING SAME", the contents of all of which are incorporated by reference herein in their entirety.

FIELD

The present invention relates to a user engagement computer system that promotes increased engagement between two or more user devices for video chats.

BACKGROUND

Current video chat applications for video communications between user devices offer the advantage of improved interaction between user devices associated with users by presenting substantially simultaneous video and audio. The term "video chat" is used herein to include a video call between two or more user devices, and is inclusive of video conferencing among multiple user devices. However, these video chat applications do not sufficiently encourage user engagement among user devices as the applications suffer from the following shortcomings.

One shortcoming is that current video chat applications require manual establishment of communications between the user devices on demand. A user "declares" that he or she is actively using the user device, such as by entering, via the user device, a user name and/or password, a fingerprint, or by facial recognition, to name a few. Otherwise, without this affirmative identification by the user, the user device is unaware who is using it. Then, the user instructs the video chat application, via the user device, when to open the application and call another user. This process may be scheduled via noting an appointment for a video chat session on a calendar either once or on a regular basis, subject to ongoing scheduling changes. Once a user has joined the video chat, the users must manually identify who has joined the meeting if that user, such as a colleague or employee, is joining remotely. There is no way to validate this data via video chat or calendar applications.

Another shortcoming is that there are no automated person-specific protections in prior art video chat applications, such as protections against video chats from being inappropriately initiated by an untrustworthy adult with a child and protections for a child accessing certain features during a video chat.

Another shortcoming is that the user devices do not know who should be able to access certain features or information. Therefore, the user devices must rely on users to manually "unlock" (i.e., establish settings) the user device features and information via usernames, passwords and/or PINs to prevent unauthorized users from viewing private information or changing functionality of the user devices. Those who are authorized to make changes often forget the required information, thus de-facto locking out authorized users. This may lead to dissatisfaction with the video chat application.

Another shortcoming occurs where users wish to jointly read aloud a story, such as from a publication, a book in print, or an electronic book (e-book) during a video chat. Each copy of a publication or book in print or electronic form, may only be available to one particular user device at a time so that an individual may only read the publication or book directly on his or her own device. The publication or book cannot be enjoyed by two users using two separate user devices concurrently. If two users who are not near each other want to read a publication or book together, one user has to read aloud to the other remotely located user.

Another shortcoming is that video chat applications do not currently integrate productivity applications, like a word processor, or games, for real time digital information exchange, such as for document collaboration and playing games, within the displays of video chat applications. Instead, a separate productivity or game application must be launched in addition to the video chat application on the user devices participating in the video chat. Or a game application may allow for a small video chat option in the corner of the screen for limited use for game discussions. The lack of full integration of video chat software with productivity applications or games may introduce a delay/lag between applications or may cause a distraction because there must be a separate manual setup of a live video connection that is distinct from the application or game.

Another shortcoming is that there is no current way of measuring when users are actively engaging with one another during a video chat session using the user devices. If two user devices participate in a video chat, it is possible to capture certain metadata about the video chat, e.g., start time, end time, user profiles associated with the user devices that were involved in the chat, to name a few. Although a computer system can determine how often users are using masks or filters, the computer system cannot ascertain exactly how often and for how long users are actually speaking to each other using the user devices.

Another shortcoming is that computers generally require users via the user devices to explicitly manipulate a user interface by touching a touch-sensitive screen, using a mouse or keyboard, or by speaking. However, computers do not recognize other kinds of more subtle human behaviors.

Another shortcoming is that video chat system have user interfaces that are static such that either they do not change in response to user interaction with the video chat system or only allow for pre-programmed changes that are set to change at specific times.

Video chat systems are thus deficient in many ways, including the ways mentioned above. It would be advantageous to overcome one or more of these deficiencies.

SUMMARY

In accordance with an embodiment of the present invention, a computer-implemented method is disclosed for a user engagement computer system to automatically establish a video chat session between two or more user devices in communication with the user engagement computer system without a user instruction to establish the video chat session, wherein the two or more user devices are each associated with a different user and each has a respective audio sensor, a respective video sensor, a respective motion sensor, and an interactive audiovisual player. The method includes the steps of: (a) receiving, by the user engagement computer system, (i) user presence data from each of the two or more user devices obtained by the respective audio sensor, the respective video sensor, and the respective motion sensor, and (ii) user device availability data for each of the two or more user devices; (b) determining, by the user engagement computer system, when the respective users are in proximity to the respective two or more user devices based on the received user presence data, and determining, by the user engagement computer system, whether the two or more user devices are available to establish the video chat session between the two or more user devices based on the user device availability data; and (c) automatically establishing, by the user engagement computer system, the video chat session when the user presence data and the user device availability data for each of the two or more user devices indicates that the two or more user devices and the respective users associated therewith are available for the video chat session. In embodiments, the user presence data that is received by the user engagement computer system from a respective user device of the two or more user devices includes audio, video, or motion data detected by the respective user device. In embodiments, the user device availability data that is received by the user engagement computer system from a respective user device of the two or more user devices includes data that indicates whether the respective user device is available for a video chat. In embodiments, one or more of the two or more user devices are mobile devices.

In embodiments, a first user device of the two or more user devices is associated with a first user, and the method further includes: (d) verifying, by the user engagement computer system before automatically establishing the video chat session, a presence of a trusted user associated with the first user at at least one of the two or more user devices to be included in the video chat session such that the video chat session is only automatically established in the presence of the trusted user. In embodiments, the first user is a child and the trusted user is an adult. In embodiments, the method further includes: (d) verifying, by the user engagement computer system before automatically establishing the video chat session, an absence of a non-trusted person at the two or more user devices.

In embodiments, the method for automatically establishing the video chat session includes: (d) notifying, by the user engagement computer system of the two or more user devices to be included in the video chat session, that the video chat session is ready to begin before automatically establishing the video chat session. In embodiments, the method also includes (d) tracking, by the user engagement computer system, user participation in the video chat session.

In embodiments, where a first user device of the two or more user devices is associated with a child, the method further includes: (d) detecting, by the user engagement computer system a presence of an unknown person in a vicinity of the child in the absence of a trusted user before automatically establishing the video chat session; and (e) transmitting a notification to an administrative system user upon detection of the presence of the unknown person.

Also, in embodiments, the method further includes: (d) accepting, by the user engagement computer system, an authorization by an adult user associated with a first user device of the two or more user devices to update an application on a second user device of the two or more user devices that is associated with a child.

In embodiments, the method further includes: (d) automatically determining, by the user engagement computer system using the received user presence data, whether the first user device of two or more user devices is associated with a child; and (e) automatically limiting, by the user engagement computer system, a feature or control of a user-controllable option by the first user device upon a determination that the first user device is associated with the child. In embodiments, the step of automatically limiting, by the user engagement computer system, control of a user-controllable option by the first user device upon a determination that the first user device is associated with the child includes overriding the limitation, by the user engagement computer system, of the user-controllable option upon receiving authorization from a trusted user at one of the two or more user devices.

In embodiments, the user presence data includes data that reflects at least one user-specific biometric identifier, and the automatic determination, by the user engagement computer system using the received user presence data, as to whether the first user device of two or more user devices is associated with an adult or child includes comparing the at least one user-specific biometric identifier with a reference database of biometric identifiers. In embodiments, the at least one user-specific biometric identifier is selected from a group of biometric identifiers including a user's voice, pitch, frequency, timbre, vocabulary, diction, enunciation, physical stature, facial features, touch patterns, cadence, footsteps pattern, non-vocal sound patterns, and user movements.

In embodiments, the second user device of the two or more user devices is associated with an adult, and wherein the second user device is configured to remotely change user control options for the first user device. In embodiments, the user control options include an option to change a video chat schedule.

In accordance with an embodiment of the present invention, a computer-implemented method is disclosed for automatically establishing, by a user engagement computer system operatively connected to a state machine, a video chat session between two or more user devices in communication with the user engagement computer system to establish the video chat session without a user interaction, wherein the two or more user devices are each associated with a different user. The method includes the steps of: (a) receiving, by the user engagement computer system, a notification of a change in application state at the state machine that requires the establishment of a video connection between the two or more user devices; and (b) automatically establishing, by the user engagement computer system, the video chat session between the two or more user devices upon receipt of the notification of the change in the application state. In embodiments, the change in the application state occurs in response to one of a scheduled event, a push from user engagement computer system, or a status change at one of the two or more user devices (partner status change).

In an embodiment in accordance with the present invention, a computer-implemented method is disclosed for automatically determining, by a user engagement computer system, whether an active conversation is occurring during a video chat session between two or more user devices in communication with the user engagement computer system, wherein the two or more user devices are each associated with a different user and each has a respective audio sensor, a respective video sensor, a respective motion sensor, and an interactive audiovisual player. The method includes the steps of (a) receiving, by the user engagement computer system, audio measurements associated with user speech, including amplitudes and frequencies of user speech as measured by the respective audio sensor at each of the two or more user devices; (b) analyzing, by the user engagement computer system, the received audio measurements, to determine whether an active conversation is occurring during a video chat session; and (c) performing, by the user engagement computer system in connection with the video chat session, at least one of: (I) adjusting, by the user engagement computer system during the video chat session, the audio quality based at least on the audio measurements to improve sound clarity by mitigating ambient noise; (II) determining, by the user engagement computer system, actual usage of the video chat session by the users; or (III) measuring, by the user engagement computer system, childhood development based on a rate of a child user's communication skills. In embodiments, the audio amplitudes and frequencies are measured when the amplitudes over a predetermined time exceed a minimum amplitude threshold. In embodiments, the method further comprises receiving, by the user engagement computer system, at least one of (ii) object movement measurements as detected by the respective video sensor at each of the least two user devices; and (iii) user device movement measurements that reflect user device movements of each of the two or more user devices as measured by the respective motion sensor at each of the least two user devices, and the determination, by the user engagement computer system, actual usage of the video chat session by the users is based on the audio measurements in combination with at least one of the object movement measurements and the user device movement measurements.

A computer-implemented method in accordance with an embodiment of the present invention automatically provides, by a user engagement computer system, images related to audio detected during a video chat session between two or more user devices in communication with the user engagement computer system, wherein the two or more user devices are each associated with a different user and each has a respective audio sensor, a respective video sensor, a respective motion sensor, and an interactive audio-visual player, the method including the steps of: (a) automatically detecting, by the user engagement computer system, first words or first phrases that are spoken during the video chat session; and (b) transmitting, by the user engagement computer system to the two or more user devices, a first supplementary video element related to the detected first words or first phrases to be displayed in a portion of the screen at the two or more user devices during the video chat session. In embodiments, the method is performed substantially in real-time.

In embodiments, the first supplementary video element to be transmitted includes one or more images, animations, or drawings that depict a storyline that is related to the words or phrases spoken during the video chat session. In embodiments, the first supplementary video element comprises multiple supplementary video segments to be displayed substantially at the same time or overlapping in time.

In embodiments, the method further comprises: (c) automatically detecting, by the user engagement computer system, second words or second phrases that are spoken after the first words or first phrases are spoken during the video chat session; and (b) transmitting, by the user engagement computer system to the two or more user devices, a second supplementary video element related to the detected second words or second phrases to be displayed in a portion of the screen at the two or more user devices during the video chat session. In embodiments, the second supplementary video element is to be displayed in addition to the first supplementary video elements. In embodiments, the second supplementary video element replaces the first supplementary video element when displayed.

In embodiments, the method further includes: (c) transmitting, by the user engagement computer system to the two or more user devices, supplementary audio elements related to the detected words or phrases to be displayed in a portion of the screen at the two or more user devices during the video chat session. In embodiments, the supplementary audio elements include music.

In embodiments, the method in accordance with an embodiment of the present invention, further includes selecting, by the user engagement computer system, the first supplementary video element to be transmitted by the user engagement computer system to the two or more user devices, including the steps of: (i) comparing the detected words or phrases with reference content in a content database that is stored in non-transitory computer-readable memory that is operably connected to the user engagement computer system, the content database including a compilation of textual or audio content and video content related to the textual or audio content; (ii) identifying a first portion of the textual or audio content that is identical or similar to the detected first words or first phrases; and (iii) selecting a second portion of the video content that is related to the first portion of the textual or audio content for transmission by the user engagement computer system to the two or more user devices.

In accordance with an embodiment of the present invention, a computer-implemented method provides, via a user engagement computer system, video for an shared interactive digital screen that is displayable as overlaid onto a video chat session between two or more user devices, each having a respective display and associated with a different user. The method includes (a) determining, by the user engagement computer system, whether the video chat session between the two or more user devices is in progress; and (b) transmitting, substantially simultaneously by the user engagement computer system to the two or more user devices upon request by one or more of the two or more user devices during a video chat session that is in progress between the two or more user devices, a shared interactive digital screen for a shared application for substantially simultaneous user interaction across the two or more user devices, wherein the shared interactive digital screen is formatted, by the user engagement computer system, to be displayed during the video chat session as an overlay on top of video of the video chat session on the respective display of the respective user device, upon request at the user device, wherein the overlay is partially transparent and partially opaque, such that the video of the video chat and the shared interactive digital screen are displayed and viewable simultaneously on the same respective display. In embodiments, the shared interactive digital screen is formatted to be displayed with a frosted but transparent background. In embodiments, the shared interactive digital screen is formatted to be displayed with a color scheme or graphics that indicate visually on the respective displays of the two or more user devices the shared interactive digital screen and the video of the video chat session. In embodiments, the shared interactive digital screen is configured to allow users on each of the two or more user devices to enter data, draw on the screen, or make selections. In embodiments, the respective display at at least one of the two or more user devices includes a touch screen that is used to interact with the shared interactive digital screen.

In accordance with an embodiment of the present invention, a computer-implemented method is provided for interactive engagement by two or more user devices, each associated with a different user, with a user engagement computer system that is in communication with the two or more user devices, wherein the two or more user devices each has a respective audio sensor, a respective video sensor, and a respective motion sensor. The method includes the steps of: (a) detecting, by the user engagement computer system using outputs from the respective motion sensors, a facial gestural input including a closed eye state by one or more of the respective users of the two or more user devices for a predetermined period of time; and (b) initiating, by the user engagement computer system, an automated action to further engage at least one of the different users in response to the facial gestural input, wherein the automated action includes (i) starting, at a time of reduced interaction or no other user interaction between the two or more user devices, one of an interactive game or a meditation session; or (ii) transmitting a verbal communication to one or more of the two or more user devices. In embodiments, the method in accordance with the present invention is performed by the user engagement computer system during a video chat session between the two or more user devices.

In accordance with another embodiment of the present invention, a computer-implemented method is provided for interactive engagement by two or more user devices, each associated with a different user, with a user engagement computer system that is in communication with the two or more user devices, wherein the two or more user devices each has a respective audio sensor, a respective video sensor, and a respective motion sensor. The method includes the steps of: (a) detecting, by the user engagement computer system using outputs from the respective audio sensors, a gestural input including blowing of air by a respective user of one of the two or more user devices into a microphone at the respective user device; and (b) initiating, by the user engagement computer system, an automated action to further engage at least one of the different users in response to the gestural input including the user's blowing of air. In embodiments, the method is performed by the user engagement computer system during a video chat session between the two or more user devices. In embodiments, the automated action that is performed during the video chat session includes activating an shared interactive digital screen that is displayable as overlaid onto the video chat session between the two or more user devices.

In accordance with another embodiment of the present invention, a computer-implemented method is provided for interactive engagement by at least one user devices, associated with a user, with a user engagement computer system that is in communication with the user device, wherein the user device has an audio sensor, a video sensor, and a motion sensor. The method includes the steps of: (a) detecting, by the user engagement computer system based on audio data received from the audio sensor, that a song is being sung by the user associated with the user device by comparing the received audio data with reference content in a content database that is stored in non-transitory computer-readable memory operably connected to the user engagement computer system, the content database including a compilation of song content; and (b) automatically initiating, by the user engagement computer system, musical accompaniment including chords to be played by the user device while the song is detected at the user device.

In accordance with another embodiment of the present invention, a user engagement computer system for automatically providing images related to audio detected during a video chat session between two or more user devices in communication with the user engagement computer system, wherein the two or more user devices are each associated with a different user and each one of the two or more user devices has a respective audio sensor, a respective video sensor, a respective motion sensor and an interactive audio-visual player, the user engagement computer system comprising one or more processors and computer-readable memory operatively connected to the one or more processors and having stored thereon instructions that, when executed by the one or more processors, cause the one or more processors to perform the steps of: (a) automatically detecting, by the user engagement computer system, first words or first phrases that are spoken during the video chat session; and (b) transmitting, by the user engagement computer system to the two or more user devices, a first supplementary video element related to the detected first words or first phrases to be displayed in a portion of the screen at the two or more user devices during the video chat session. In embodiments, the first supplementary video element comprises multiple supplementary video segments to be displayed substantially at the same time or overlapping in time. In embodiments, the first supplementary video element to be transmitted comprises one or more images, animations, or drawings that depict a storyline that is related to the words or phrases spoken during the video chat session.

In embodiments, when executed by the one or more processors, the instructions cause the one or more processors to further perform the steps of: (c) automatically detecting, by the user engagement computer system, second words or second phrases that are spoken after the first words or first phrases are spoken during the video chat session; and (d) transmitting, by the user engagement computer system to the two or more user devices, a second supplementary video element related to the detected second words or second phrases to be displayed in a portion of the screen at the two or more user devices during the video chat session. In embodiments, the second supplementary video element is to be displayed in addition to the first supplementary video elements. In embodiments, the second supplementary video element replaces the first supplementary video element when displayed.

In embodiments, when executed by the one or more processors, the instructions cause the one or more processors to further perform the step of: (c) transmitting, by the user engagement computer system to the two or more user devices, a supplementary audio element related to the detected first words or first phrases to be displayed in a portion of the screen at the two or more user devices during the video chat session. In embodiments, the supplementary audio element comprises music.

In embodiments, when executed by the one or more processors, the instructions cause the one or more processors to further perform the steps of: (c) selecting, by the user engagement computer system, the first supplementary video element to be transmitted by the user engagement computer system to the two or more user devices by performing at least the following steps: (i) comparing, by the user engagement computer system, the detected first words or first phrases with reference content in a content database that is stored in non-transitory computer-readable memory that is operably connected to the user engagement computer system, the content database including a compilation of textual or audio content and video content related to the textual or audio content; (ii) identifying, by the user engagement computer system, a first portion of the textual or audio content that is identical or similar to the detected first words or first phrases; and (iii) selecting, by the user engagement computer system, a second portion of the video content that is related to the first portion of the textual or audio content for transmission by the user engagement computer system to the two or more user devices.

In accordance with another embodiment of the present invention, a user engagement computer system for providing video for an shared interactive digital screen that is displayable as overlaid onto a video chat session between two or more user devices, each one of the two or more user devices having a respective display and being associated with a different user, the user engagement computer system comprising one or more processors and computer-readable memory operatively connected to the one or more processors and having stored thereon instructions that, when executed by the one or more processors, cause the one or more processors to perform the steps of: (a) determining, by the user engagement computer system, whether the video chat session between the two or more user devices is in progress; and (b) transmitting, substantially simultaneously by the user engagement computer system to the two or more user devices upon request by one or more of the two or more user devices during the video chat session that is in progress between the two or more user devices, a shared interactive digital screen for a shared application for substantially simultaneous user interaction across the two or more user devices, wherein the shared interactive digital screen is formatted, by the user engagement computer system, to be displayed during the video chat session as an overlay on top of video of the video chat session on the respective display of the respective user device, upon request at the user device, wherein the overlay is partially transparent and partially opaque, such that the video of the video chat session and the shared interactive digital screen are displayed and viewable simultaneously on the same respective display.

In embodiments, the shared interactive digital screen is formatted to be displayed with a frosted but transparent background. In embodiments, the shared interactive digital screen is formatted to be displayed with a color scheme or graphics indicating visually on the respective displays of the two or more user devices the shared interactive digital screen and the video of the video chat session. In embodiments, the shared interactive digital screen is configured to allow users on each one of the two or more user devices to enter data, draw on the screen, or make selections. In embodiments, the respective display at at least one of the two or more user devices includes a touch screen that is used to interact with the shared interactive digital screen.

In accordance with another embodiment of the present invention, a user engagement computer system for interactive engagement by two or more user devices, each associated with a different user, with the user engagement computer system being in communication with the two or more user devices, wherein the two or more user devices each has a respective audio sensor, a respective video sensor, and a respective motion sensor, the user engagement computer system comprising one or more processors and computer-readable memory operatively connected to the one or more processors and having stored thereon instructions that, when executed by the one or more processors, cause the one or more processors to perform the steps of: (a) detecting, by the user engagement computer system using outputs from at least one of the respective audio sensors, the respective video sensors and the respective motion sensors, a gestural input by one or more of the respective users of the two or more user devices; and (b) initiating, by the user engagement computer system, an automated action to further engage at least one of the different users in response to the gestural input.

In embodiments, the gestural input comprises a facial gestural input and the at least one of the respective audio sensors, the respective video sensors and the respective motion sensors comprises the respective motion sensors. In embodiments, the gestural input comprises blowing of air by a respective user of one of the two or more user devices into a microphone at the respective user device and the at least one of the respective audio sensors, the respective video sensors and the respective motion sensors comprises the respective audio sensors. In embodiments, the automated action that is performed during the video chat session comprises activating an shared interactive digital screen that is displayable as overlaid onto the video chat session between the two or more user devices.

BRIEF DESCRIPTION OF THE DRAWINGS

Exemplary embodiments of the present invention will be described with references to the accompanying figures, wherein.

DETAILED DESCRIPTION OF THE INVENTION

Figure 1:
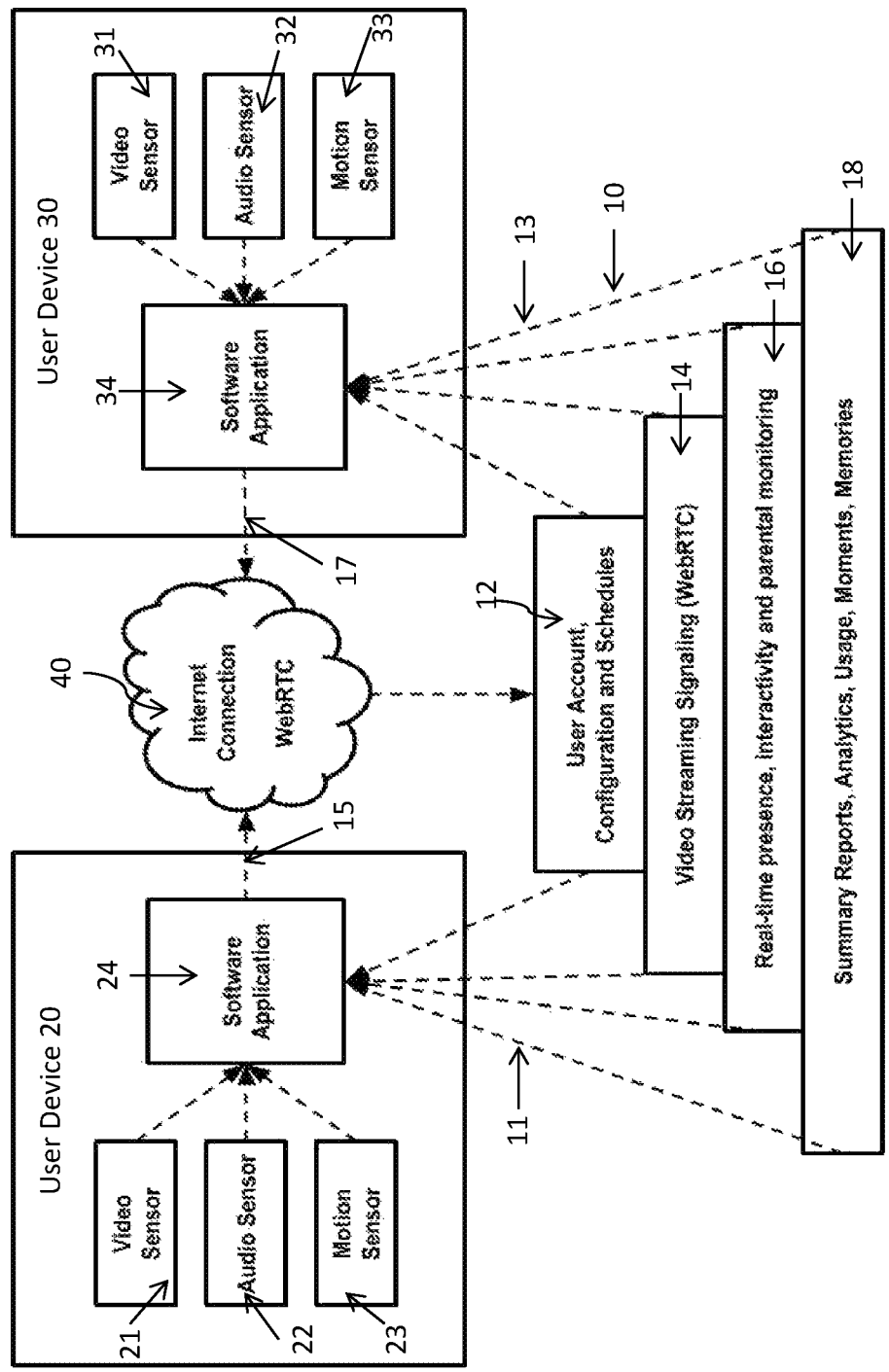
FIG. 1 illustrates a system architecture in accordance with an embodiment of the present invention that shows a user engagement computer system interacting with two user devices for video chatting.

The present invention generally relates to embodiments of a user engagement computer system and method of using same that enhance the user experience. In embodiments, the user engagement system enhances one or more of the following user experiences: detecting user presence, allowing easier control of user options by automatically detecting who is in the vicinity of the user devices and allowing a detected authorized user to control user options, simplifying the establishment of video chat sessions by automating the scheduling of video chat sessions based on a detected pattern of user presence, visualizing of stories during storytelling, providing a shared interactive digital screen on the user devices for use during the video chat, providing user motion and gesture controls, added safety measures, such as to protect children and prevent participation by untrusted individuals in video chats, actively measuring user engagement during a video chat session, and utilizing state machines that allow a video chat user interface to dynamically change between system states. In embodiments, at least one or more of these features, described in detail below, substantially enhances user engagement as the feature or features relate to establish a safe space for video chats, establishing more frequent video chats between users, and provide additional features that enable users to use the video chat session for additional simultaneous activities that can make the video chat experience more interesting. In embodiments, including one or more of these additional features in a video chat system and method encourages interaction between users (such as children and their grandparents or other relatives) in safe video chat sessions.

As used herein, the term "user presence" refers to the presence of a person at a user device. To be detected, the user needs to be in proximity to the user device sufficiently for one or more sensors to detect the person's presence. Thus, the detection of a "user presence" will depend on different factors, such as, for example, sensitivity of sensors, the distance of a person is to the user device, hardware or software settings for a positive "user presence" determination (e.g., setting a minimum magnitude and/or duration of a detected signal, such as the amplitude and duration of a signal), to name a few. A user presence may be affirmatively detected, for example, when a user is close to the user device or more distant from the user device as long as some video, audio, and motion data is sufficiently discernable to identify the particular users. At best, a user may be close to the user device such that the user is within range of all sensors such as video, audio, and motion sensors and the video, audio, and motion is detected at an amplitude above a threshold. On the other hand, a user presence may also be detected in circumstances where only one such sensor, such as an audio sensor, detects the user. In embodiments, a particular user may be associated with a particular user device or a user of the device may be a user who is not generally associated with that user device (e.g., someone else in the room such as a family member or friend).

FIG. 1 depicts a system architecture in accordance with an embodiment of the present invention in which a user engagement computer system 10, which may be implemented, for example, on one or more servers, communicates separately with each of two user devices 20, 30, such as via respective first and second wired or wireless connections 11, 13. Each of connections 11, 13 may include a single connection or various separate connections for different modules at user engagement computer system 10, such as for user account, configuration and schedules module 12, video streaming signaling module (webRTC) 14, real-time presence module, interactivity and parental monitoring 16 module, and reporting module 18 for compiling tracked information such as summary reports, analytics, usage, moments, and memories.

In embodiments, a user device, e.g., user device 20 and user device 30, may be, for example, a desktop computer or a mobile device, such as a smartphone, a tablet computer, a laptop computer, a wearable computer, a cell phone, a personal digital assistant (PDAs), or a specially-configured terminal, to name a few. In embodiments, user devices 20, 30 may be operated by users that may be registered users that establish registered accounts with login credentials (e.g., username and/or password). User devices 20, 30 communicate with each other via the Internet 40 over a third wired connection or wireless connection. Connected user devices 20, 30 may be termed "paired devices."

As described above, user engagement computer system 10 may be electronically connected to user devices 20, 30 and user devices 20, 30 may be paired with each other across one or more data networks, such as the Internet, a telephone network, a mobile broadband network (e.g., a cellular data network), a mesh network, a local area network (LAN) (including a wireless local area network, e.g., a Wi-Fi network), a wide area network (WAN), a metropolitan area network (MAN), and/or a global area network (GAN), to name a few. Data networks may be provided via wired and/or wireless connections. Data networks may be public or private. Accordingly, data networks may be open or closed, such as requiring authorized access, specific communication connections, or specialized hardware and/or software. In embodiments, any combination of communications channels may be utilized by the system 10 and user devices 20, 30. System 10 and user devices 20, 30 may each include one or more communications portals, which may handle, process, support, and/or perform wired and/or wireless communications, such as transmitting and/or receiving data (e.g., data packets), as described further herein. In embodiments, transmission described with respect to a single data packet may include a plurality of data packets. Data packets may be discrete electronic units of data. In other embodiments, transmissions may include non-discrete signals, such as data streams. Transmissions described with respect to data packets may also comprise data transmissions via other communications mechanisms known in the art, such as data streams. Communications portals may include hardware (e.g., hardware for wired and/or wireless connections, such as communications chipsets, communications interfaces, and/or communications antennas, to name a few) and/or software.

Wired connections may be adapted for use with cable, plain old telephone service (POTS) (telephone), fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports, such as Apple 30-pin connector ports or Apple Lightning connector ports, to name a few. Wireless connections may include cellular or cellular data connections and protocols (e.g., digital cellular, PCS, CDPD, GPRS, EDGE, CDMA2000, 1×RTT, Ev-DO, HSPA, UMTS, 3G, 4G, 5G, and/or LTE, to name a few), Bluetooth, Bluetooth Low Energy, Wi-Fi, radio, satellite, infrared connections, and/or ZigBee communication protocols, to name a few. Communications interface hardware and/or software, which may be used to communicate over wired and/or wireless connections, may include Ethernet interfaces (e.g., supporting a TCP/IP stack), X.25 interfaces, T1 interfaces, and/or antennas, to name a few.

Referring again to FIG. 1, each user device 20, 30 includes one or more sensors. User device 20 includes a video sensor 21 (e.g., a camera), an audio sensor 22 (e.g., a microphone), and a motion sensor 23 (e.g., a gyroscope) that respectively detect video, audio and motion in the vicinity of user device 20. Similarly, user device 30 includes a video sensor 31 (e.g., a camera), an audio sensor 32 (e.g., a microphone), and a motion sensor 33 that respectively detect video, audio and motion in the vicinity of user device 30. A software application 24, 34 is installed on each of user devices 20, 30 and is configured to communicate, upon installation, with user engagement computer system 10. Software application 24, 34 is generally provided by the provider of user engagement computer system 10. User engagement computer system 10 captures IP addresses of user devices 20, 30 that download the software application.

As indicated in FIG. 1, software application 24 is installed on user device 20 and software application 34 is installed on user device 30. Software applications 24 and 34 may be identical, may be different versions of the same application, or may be different software that provides the necessary functionality to perform the desired functions and interact with user engagement computer system 10. Software applications 24, 34 may have functionality to implement all of the features described herein or, in embodiments, may only support a subset of those features.

User engagement computer system 10 includes modules for (1) user account, configuration and schedules 12, (2) video streaming signaling 14 (such as with WebRTC that provides web browsers with real-time communications capabilities via JavaScript APIs), (3) real-time presence, interactivity, and parental monitoring 16, and (4) summary reports, analytics, usage, moments, and memories 18. In embodiments, user account, configuration and schedules module 12 processes user account information, device configuration, and schedules for video chats, module 14 handles video streaming signaling for the video chat sessions, module 16 performs real-time user presence analysis based on received user presence data, interactivity between user devices, and parental monitoring of video chat usage, such as by children. Module 18 prepares reports, performs analytics of compiled data, maintains data regarding system usage, and may capture significant moments and memories.

Figure 2:
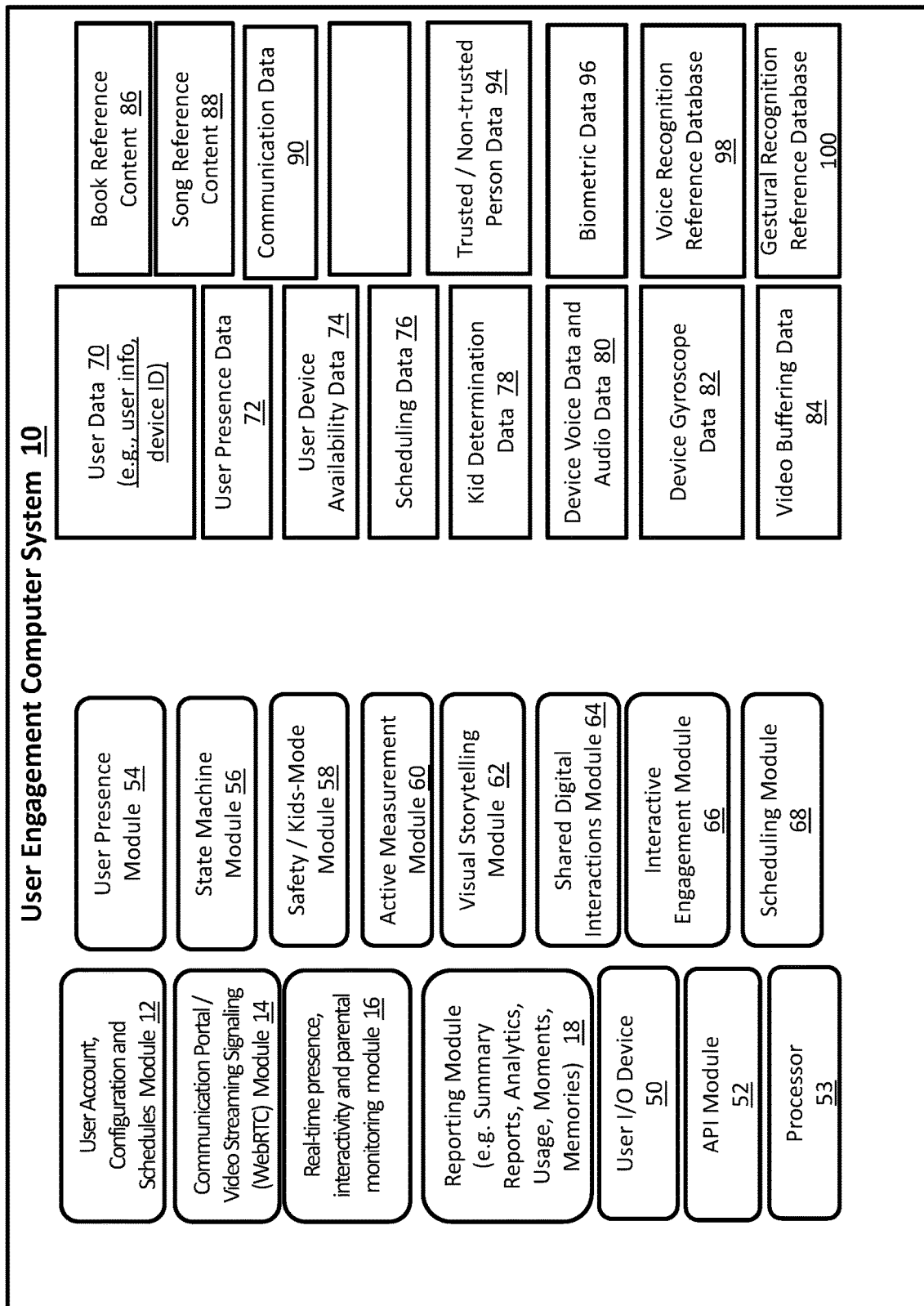
FIG. 2 illustrates a user engagement computer system in accordance with an embodiment of the present invention.

FIG. 2 illustrates, in greater detail, user engagement computer system 10 in accordance with an embodiment of the present invention that shows modules 12, 14, 16 and 18 as well as additional modules to illustrate various features that may be included in user engagement computer system 10. In addition to modules 12, 14, 16, and 18 shown in FIG. 1, user engagement computer system 10 in FIG. 2 may further include a user input/output device 50 for administrative user interaction with user engagement computer system 10, an API module 52, a processor 53, one or more of the following modules for implementing the features of the present invention: presence module 54 (which may assume the real-time presence function instead of that function being performed by module 16), state machine module 56, kids-mode module 58, active measurement module 60, visual storytelling module 62, shared digital interactions module 64, and interactive engagement module 66, and one or more data stores, such as data stores 70, 72, 74, 76, 78, 80, 82, 84, 86, 88, 90, 94, 96, 98, and 100, which are shown as separate components in FIG. 2 but may be consolidated into fewer data stores. User engagement computer system 10 records user data at data store 70. This data may include user identifier and information about the user devices that are registered with user engagement computer system 10 including device IDs, configurations, and features supported by user engagement computer system 10 that have been downloaded onto those user devices. User presence data is stored at data store 72.

Each of FIGS. 4A, 5, 7A, 9A, 10A, and 11A shows one or both of user devices 20, 30 with only a subset of the available software modules that may be installed on user devices 20, 30 so as to separately highlight different features of the present invention.

It should be understood that, in embodiments, user engagement computer system 10 may support only one feature or fewer than all of the features described herein and, in that case, only modules and data stores that enable those feature(s) in the user engagement computer system 10 may be present.

Figure 3:
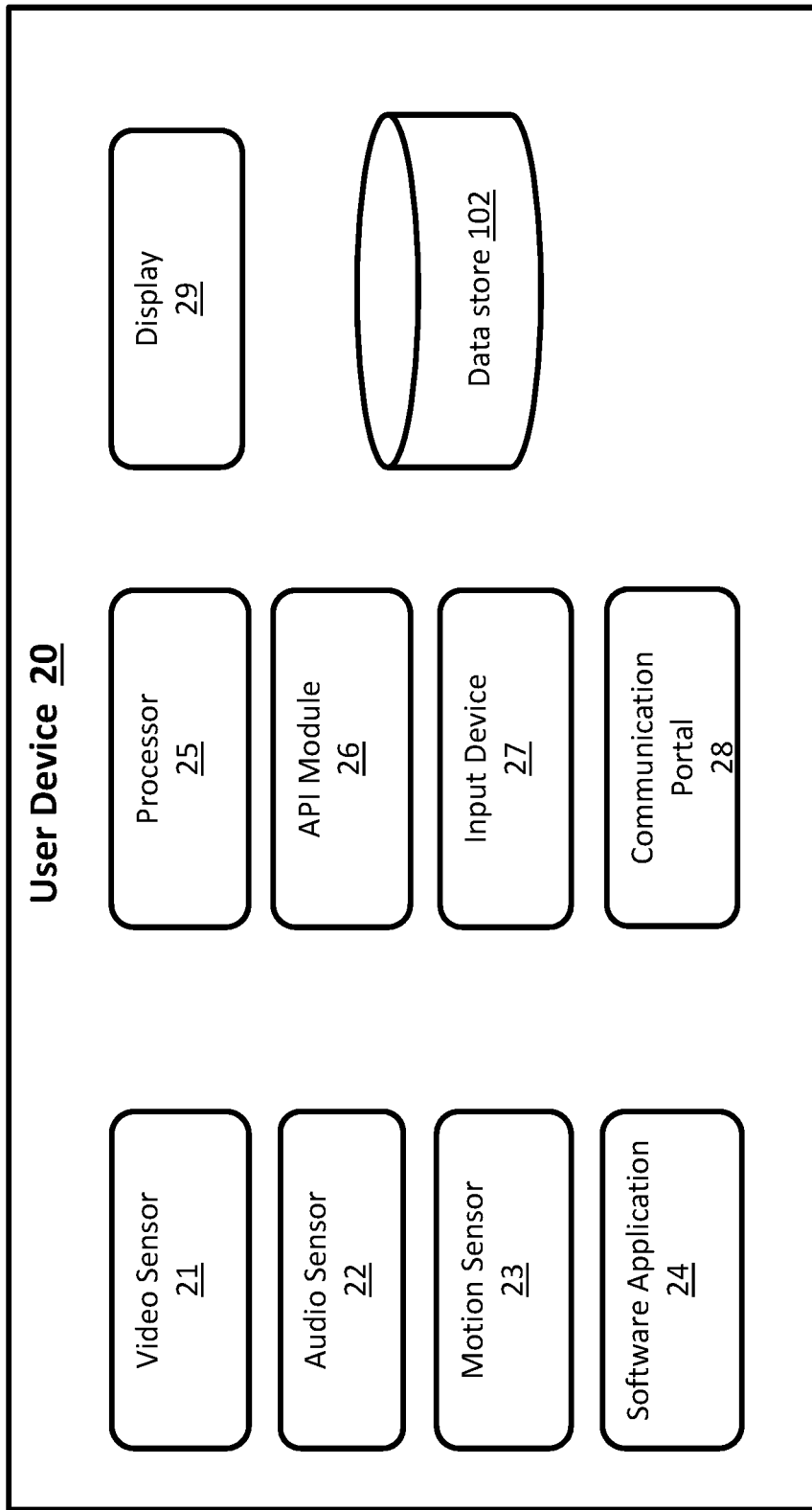
FIG. 3 illustrates a user device in accordance with an embodiment of the present invention.

FIG. 3 depicts a more detailed view of a user device, such as user device 20, in accordance with the present invention, which includes video sensor 21, audio sensor 22, motion sensor 23 and at least one software application 24 (as shown in FIG. 1) and may further include a processor 25, an API module 26, at least one input device 27, a communication portal 28, a display 29, and a local data store 102. User inputs may be made via keyboard, mouse or on a wireless device may be via a touchscreen (combined with the display), buttons, keypad or other input device. While only user device 20 is illustrated in FIG. 3 and in some exemplary figures below, in embodiments, user device 30 may be similar or identical to user device 20.

User Presence/Kids Modes

As noted above, prior art video chat applications require manual establishment of communications between the user devices on demand. Also, prior art user devices must rely on users to manually "unlock" (i.e., establish settings for) the user device features and information via usernames, passwords and/or PINs to prevent unauthorized users from viewing private information or changing functionality of the user devices. Those who are authorized to make changes often forget the required information, thus de-facto locking out authorized users, which can lead to dissatisfaction with the application.

Figure 4A:
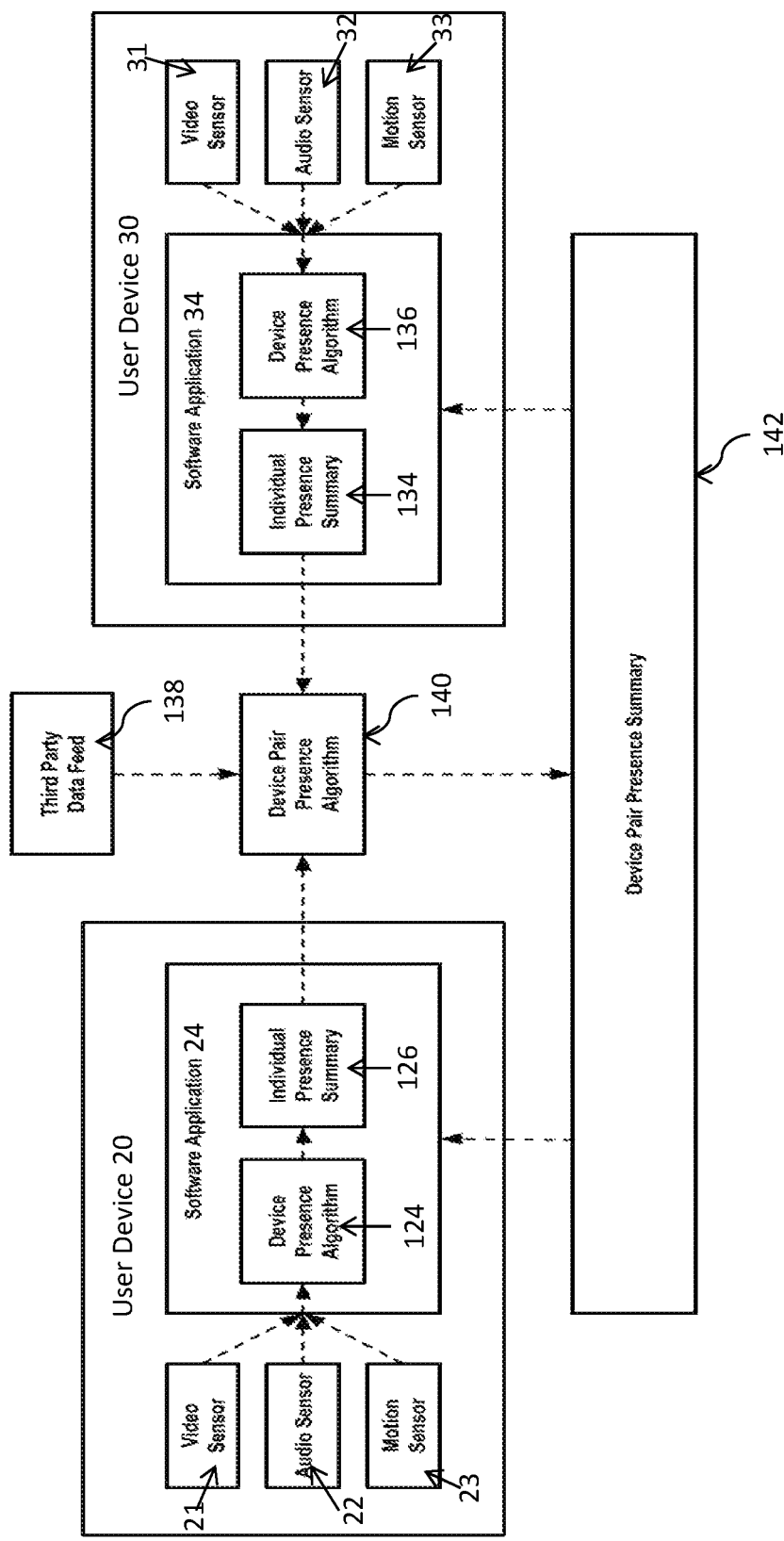
FIG. 4A illustrates a system for determining a user presence at each of the user devices in connection with a video chat session in accordance with another embodiment of the present invention.

These technological shortcomings are overcome by an embodiment of the present invention illustrated in FIG. 4A in which user engagement computer system 10 is configured to automatically determine user presence at user devices, without users identifying themselves. Instead, one or more sensors at a user device detect one or more of audio, video or motion and use that information in reaching a determination as to who is present at a user device.

In embodiments, a user presence determination may be made before initiating a video chat session using presence module 54 at each user device, such that a user presence determination at each of user devices 20, 30 is used as a basis for determining whether users are available to participate in the video chat session.

In embodiments, such as shown in FIG. 4A, software applications 24, 34 loaded on respective user devices 20, 30 include a device presence algorithm 124, 134 that determines user presence information for each user device 20, 30. Device presence algorithm may be used to detect, for example, whether or not a person is present at the respective user device, how many people are present at the user device, who is present at the device, how close the users are to the user device 20, 30, to name a few. The output of the device presence algorithm 124, 134 is an individual presence summary 126, 136, which, depending on the information captured by device presence algorithm 124, 134, may indicate, for example, whether or not a user is present, how many users are present, which users are present at the respective user device 20, 30, how close the users are to the device, to name a few. The user presence data generated by user devices 20, 30 using device presence algorithm 124, 134, respectively, need not determine user presence with 100% accuracy, but may reflect a determination based on an approximate match of the captured user data to reference data for users. In embodiments, the user presence data, may be generated based on, for example, a definite data match of approximately at least 70%, 80% or 90%, to name a few.

User devices 20, 30 may become associated with user engagement computer system 10 through completion of a user registration process with the user engagement computer system 10 (e.g., storing information in the user account, configuration and schedules module 12). In embodiments, the registration process at the user engagement computer system 10 includes obtaining the device ID of a first user device, such as the IP address of the device, and user information, including an email address or other identifier associated with the user of the user device. The device ID and user information are stored as user data in data store 70 of user engagement computer system 10. The registered user device 20 may then be prompted for email addresses of other users with whom user device 20 wishes to have a video chat. User engagement computer system 10 may transmit an invitation via email to another user who may then register a second user device, such as user device 30, with user engagement computer system 10. Invitations may be sent to additional users specified by a user of user device 20.

In embodiments, user engagement computer system 10 may also have user information for other users and associated user devices through other sources and may offer the newly registered user an opportunity to communicate with an already registered user via a video chat, with suggestions possibly made by mining information associated with that user from other sources such as online phone directories or other sources. In embodiments, pairing between user devices may be based at least in part on demographic information captured as part of user data.

After registration, user devices 20, 30 may be paired with each other to enable the automated establishment of a video chat session between user devices 20, 30. An initial video chat session between user devices 10 may be scheduled through user engagement computer system 10 to begin at a fixed time and date, e.g., 4 p.m. on Monday, Jan. 1, 2018. However, as explained further below, in embodiments, a device pair presence algorithm is performed before establishing the initial video chat session and any subsequent video chat sessions. The device pair presence algorithm executed by user engagement computer system 10 takes into account the combination of device presence algorithm results for each of the user devices to be connected in the video chat session. (For example, there might be three people at one user device and zero people at the other user device so no video chat session should be established. Also, for example, if there is a grandparent at one user device and a grandchild at the other device, device presence algorithm is configured to determine how to proceed.) The device pair presence algorithm is based at least in part on the user presence criteria, such as whether users are present to participate in the video chat session and based on which users are in proximity to user devices 20, 30 to be detected (e.g., a presence of a child, a trusted individual, and/or a non-trusted individual is detected). The device presence algorithm may also be based at least in part on user device availability data determined by polling of the user devices before initiating the video chat to check on the availability of the user devices for video chatting. User presence data that is captured for each user device at various times may be stored at data store 72.

Referring to FIG. 4A, once user devices 20, 30 affiliate with user engagement computer system 10, system 10 is configured to capture user presence data by monitoring user devices 20, 30. The user presence monitoring at each user device may be continuous, such as substantially at all times that the user devices are on. However, generally the user presence monitoring will be scheduled to occur periodically, such as for a limited time before a scheduled video chat session. Several signals may be simultaneously monitored including video, audio, and motion signals generated by video sensors 21, 31 (cameras), audio sensors (microphones) 22, 32, and motion sensors 23, 33 when video chats/conversations are not actively occurring. The monitoring of the signals may be unnoticeable to the users at user device 20, 30 or an alert may be sent to each user device prior to that device being monitored for user presence.

The user information captured by the combination of video, audio and motion sensors is used by user engagement computer system 10 to identify users present at each user device 20, 30. In embodiments, biometric identifiers may be used to identify users. The biometric identifiers may be, for example, one or more of facial features or stature (both measured by video sensors), voice (as measured by audio sensors), touch patterns at an input device or touch screen, using video and audio sensors to detect identifying features of persons present at or near a user device, or user movements (measured by motion sensors) to detect user presence, including whether or not the user is present, who is present, and/or how many people are present at the user device. For example, facial features may be identified using facial recognition software included either at the software application 24, 34 on a respective user device 20, 30 or available at or via the user engagement computer system 10 (e.g., at real-time presence, interactivity and parental monitoring module 16). Voice recognition software at software application 24, 34 on a respective user device 20, 30 or at or via user engagement computer system 10 (e.g., at real-time presence, interactivity and parental monitoring module 16) may be used to identify voice characteristics (vocal traits) such as, for example, a user's voice, pitch, frequency, timbre, vocabulary, amplitude, diction, enunciation, cadence, sound (practically little kids can be identified by how they walk/run in a house), footsteps pattern, and other non-vocal sound patterns.

The measured biometric identifiers (video, audio, touch, etc.) are compared against a reference database 96 of biometric identifiers at or via user engagement computer system 10 to aid in user identification. To even more accurately determine who the user is, the detected facial and voice characteristics may be combined with other factors, such as a user's schedule (where a mom might go to work early and dad is still home) and a user's known association or prior association with a particular user device, to derive a likelihood that the detected face and voice belong to a specific user. Thus, for example, if user presence data shows the presence of a user with a high pitched voice with a limited vocabulary who is home from 3-8 p.m. Monday through Friday, then the user is likely a child.

Similarly, if user engagement computer system 10 recognizes the same voice repeatedly at the same user device, it can be determined with confidence that the user owns the device and/or is a trusted user. If the trusted user wishes to change a setting, user device may present a prompt to the user to "enter code" for the user to confirm that the user is an adult.

In embodiments, in addition to identifying users through a user presence algorithm and before initiating a video chat session, user engagement computer system 10 further polls the user devices that are registered with user engagement computer system 10 to check for user device availability for a video chat. The user device availability data may be stored at user engagement computer system at data store 74. Monitoring of user presence may be conducted offline when user devices 20, 30 are not communicating and/or during video chat sessions so that changes in user presence may be detected and video chat sessions may be terminated if an untrusted user's presence is first detected during a video chat session, rather than before the commencement of the video chat session.

In embodiments, once the user presence data and user device availability data are verified, user engagement computer system 10 may further transmit a notification to each of the user devices 20, 30 before initiating a video chat session between the user devices so as to avoid a surprise to the users at the user devices that a video chat session has been initiated. The notification may be, for example, a visual or audio notification that one user associated with a particular user device is available for a video chat session (e.g., the user is home) to another user so that, before a video chat session is initiated, the users can (a) enjoy comfort of knowing the other user is home, (b) know in advance if they are home to connect via user engagement computer system 10, and (c) maintain privacy before connecting since live video will not be transmitted before each user agrees to the video chat session. Where a notification is provided, user engagement computer system 10 may await a positive reply from each user device before initiating the scheduled video chat session. The reply may be entered by a user, such as via a user input 27 at user device 20 or via other explicit or implicit signals provided by the users, such as spoken commands or gestures.

In embodiments, decisions on whether to proceed with the video chat session at the scheduled time may be based not only on user presence and device availability but may also be based on at least one of the following criteria: if the IP address of the user device is the same as it was in a previous video chat session involving that user device, if the device ID is the same as it was in a previous video chat session involving that user device, and whether or not the user device is at the same approximate location as before, as determined by a GPS (global positioning system) sensor when present on a user device.

In embodiments, real-time presence interactivity and parent monitoring module may track each user's participation in a video chat session and reporting module 18 may compile summary reports, analytics, usage, and any moments of significance during the video chat session and store this data in user presence data store 72. In this event, over time, user engagement computer system 10 learns at what times user devices typically actively engage in video chat sessions established via user engagement computer system 10. Thus, in embodiments, user engagement computer system 10 may be configured to not only use user presence data to determine whether to proceed with a scheduled video chat session but may also be configured to use the compiled user presence data for each of user devices 20, 30 to determine a usage pattern to intelligently and automatically create a video chat schedule for each user device 20, 30 using scheduling module 68 to schedule future video chat sessions between two user devices 20, 30 and/or between one of user devices 20, 30 and another user device. The schedule data may be stored in scheduling data store 76. Users need not take any action to establish the video chat session, other than be present at the scheduled time for the video chat and, if required, reply to a received notification that a video chat session is ready to begin. The automatic scheduling of video chat sessions between these user devices 20, 30 or between one of those user devices and one or more other user devices encourages the users of the user devices to connect and engage more frequently. Additionally, in embodiments, user engagement computer system 10 is able to deviate from that schedule as needed, such as if a desired user is not detected as present at either of the user devices 20, 30 or is not detected at the respective user device with which that user is usually associated.

In embodiments, where a user or user account is associated with multiple user devices, user engagement computer system 10 may also determine with which user device the video/audiovisual connection should be made to ensure that connections are made to the correct device where users are located presently.

The obtained user presence data also allows for user engagement computer system 10 to provide a customized software experience based on the identity of the user whose presence is or is not detected. For example, as noted above, another shortcoming of the prior art is that there are no automated person-specific protections in prior art video chat applications, such as protections against video chats from being inappropriately initiated by an untrustworthy adult with a child and protections for a child accessing certain features during a video chat. The present invention addresses this shortcoming by configuring user engagement computer system 10 with added safety measures provided via user engagement computer system 10 and software application 24, 34.

Figure 5:
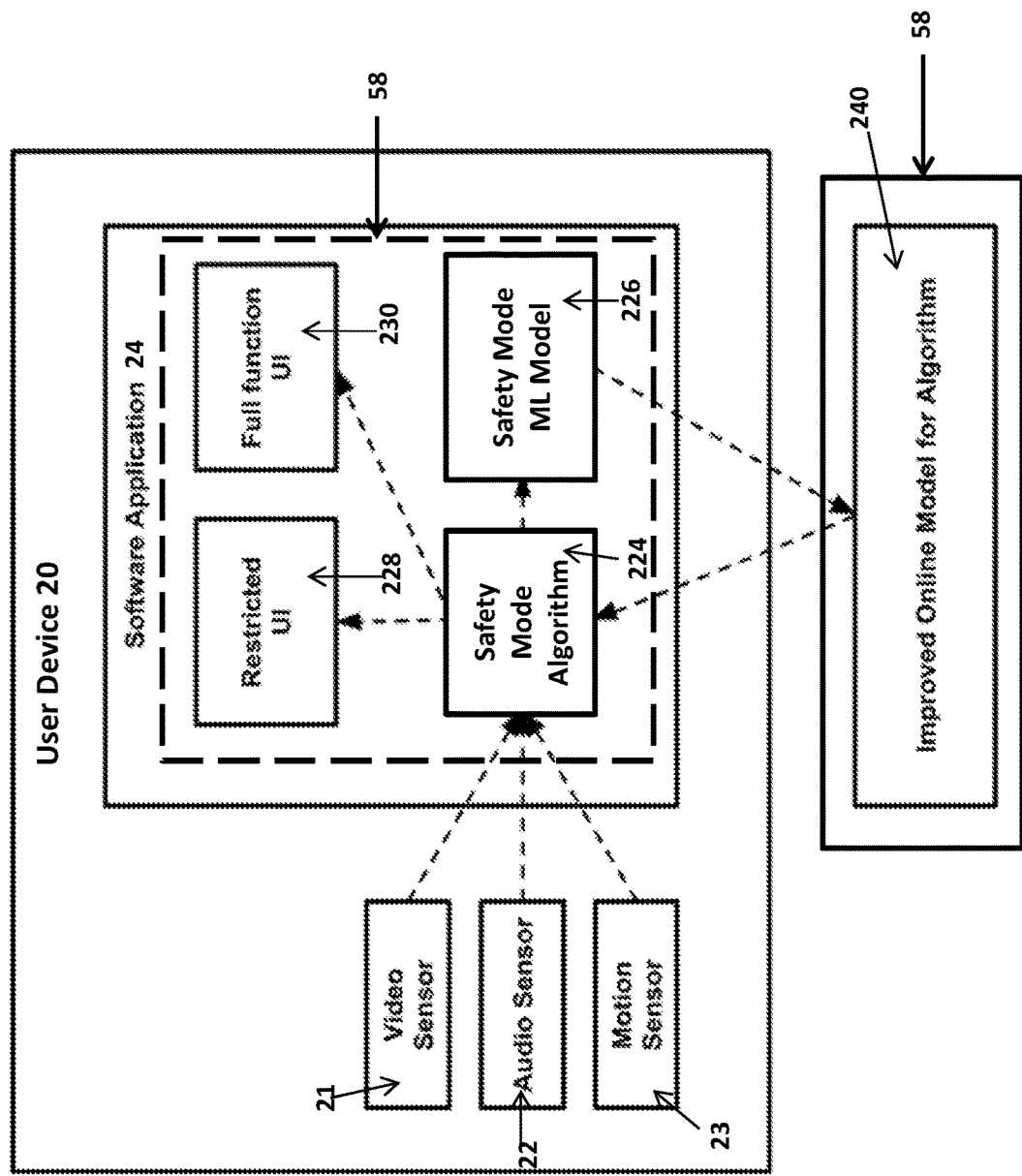
FIG. 5 illustrates the user engagement computer system in communication with a user device that includes a child safety/kids mode in accordance with an embodiment of the present invention.
Figure 6A:
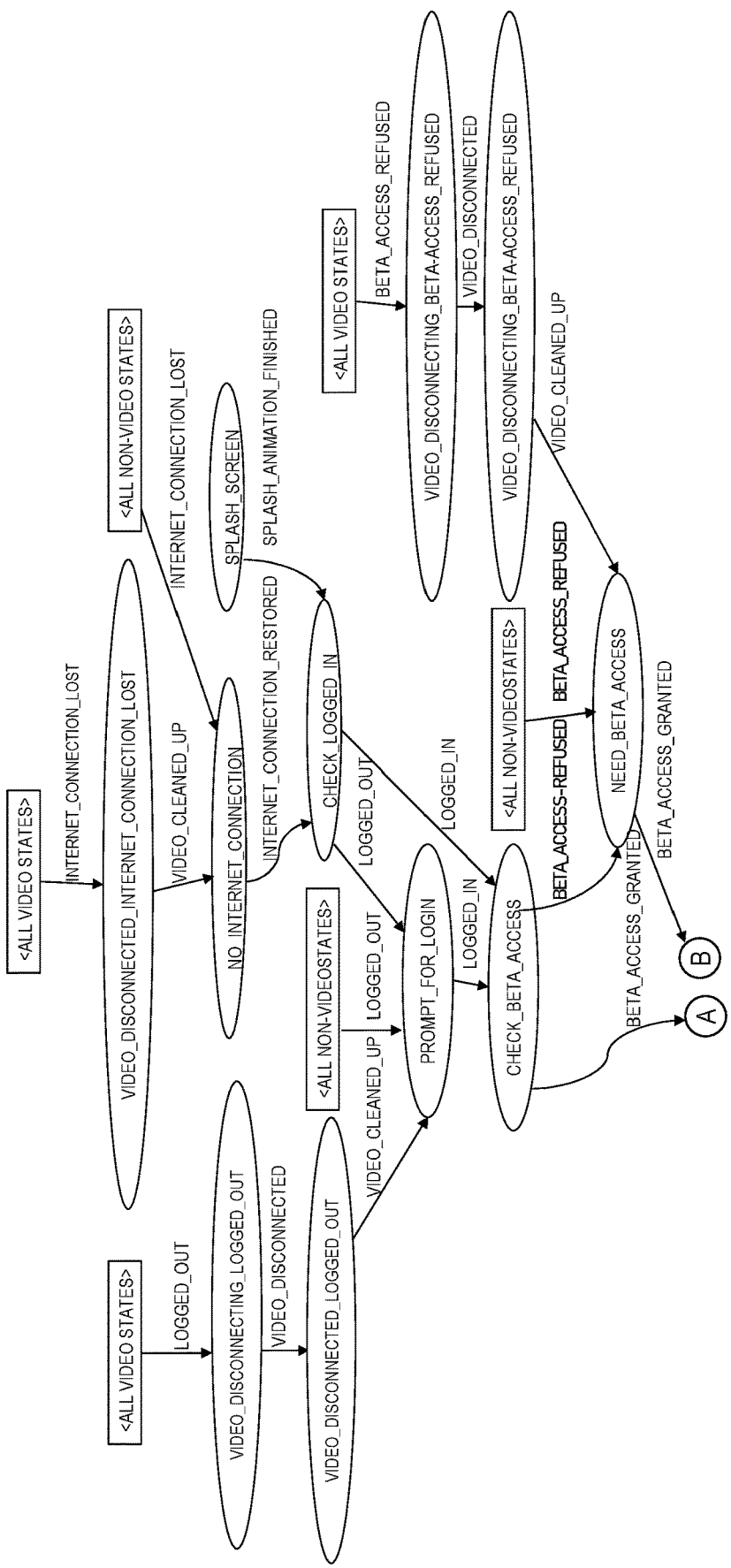
FIGS. 6A to 6D illustrate a state machine for the user engagement computer system in accordance with an embodiment of the present invention.
Figure 6B:
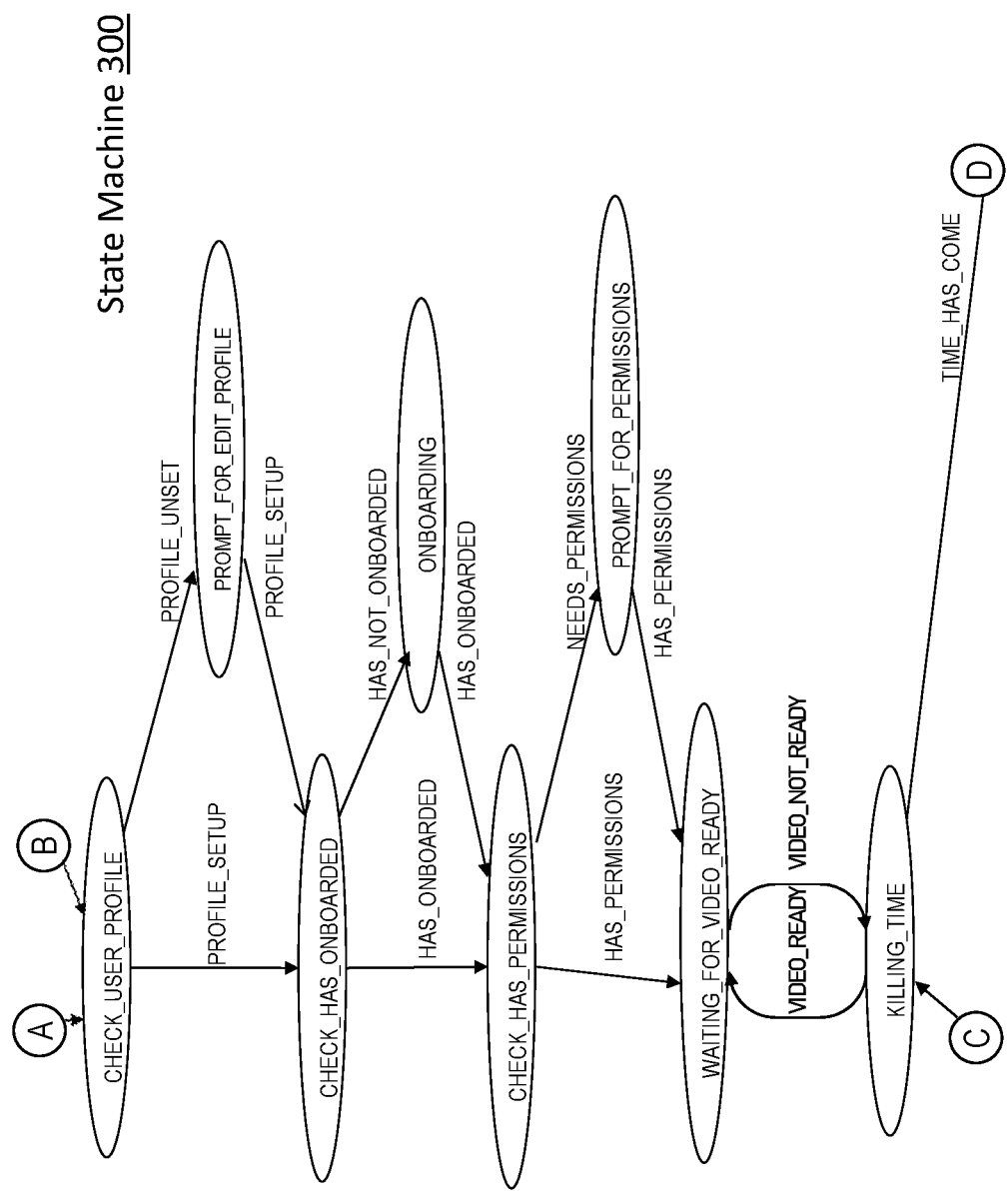
Figure 6C:
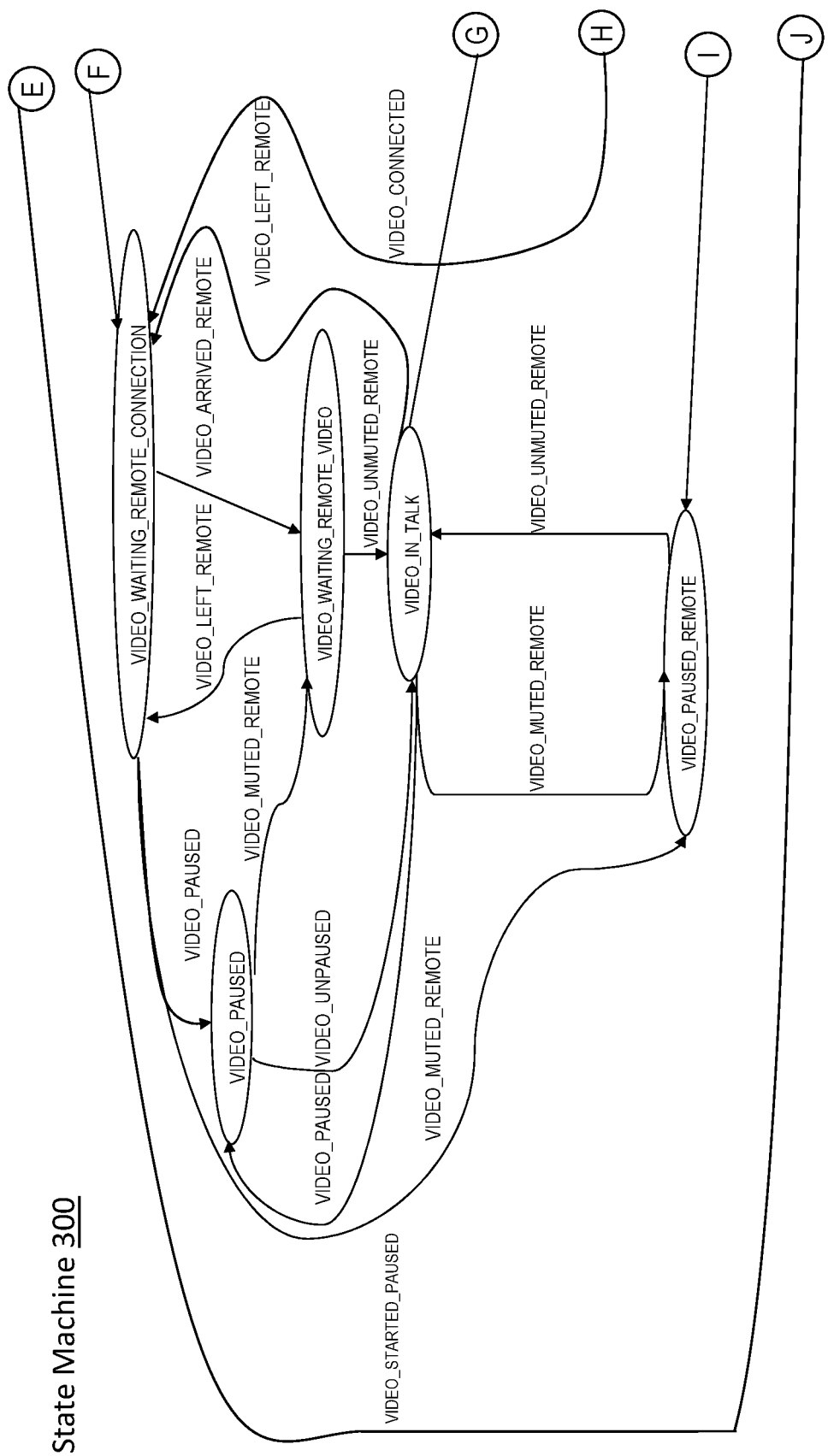
Figure 6D:
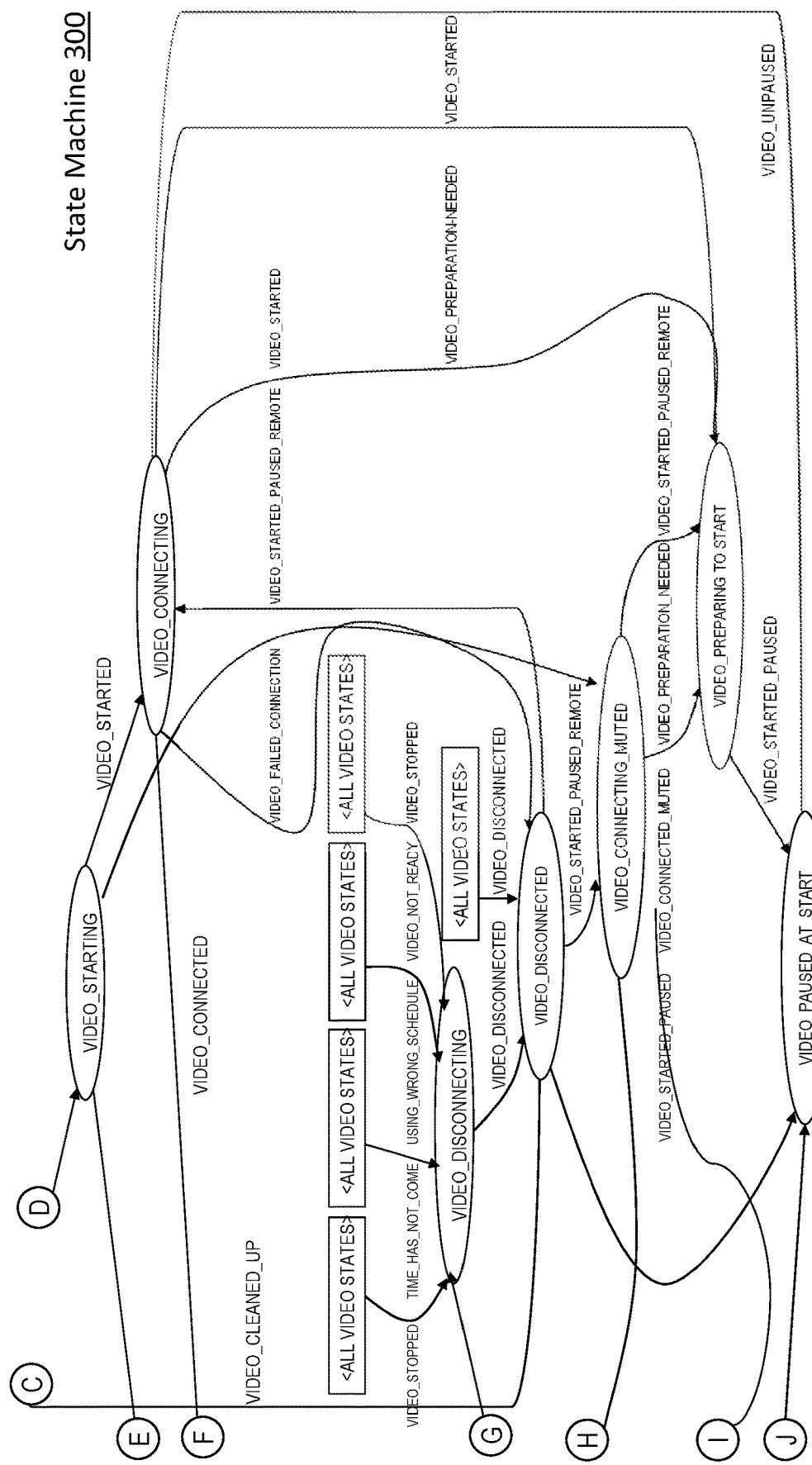

Referring to FIG. 5, in embodiments, user engagement computer system 10 may limit the establishment of the video chat session between user devices 20 and 30 unless a presence of one or more particular individuals is automatically detected at one of user devices 20, 30 using sensors 21, 22, 23 at user device 20 and sensors 31, 32, 33 at user device 30. The automatic detection of the presence of these one or more particular individuals allows those individuals to monitor the video chat session if desired, although the individuals need not participate in the video chat session.

For example, in embodiments, user engagement computer system 10 monitors whether users of one of user devices 20, 30 is an adult or is a person in a protected class, such as a child who is a minor, and reacts accordingly. If the video chat session to be established by user engagement computer system 10 involves a child who is a minor present at user device 20 and a second person present at user device 30, the video chat session may only be initiated where user engagement computer system 10 detects the presence of a known trusted person at one of user devices 20, 30 (who may be a user associated with one of the user devices or a third party that is present). The trusted person may be, for example, a parent of the child or another trusted adult. The trusted person may be required to be present at either of user devices 20, 30 or may be required more particular to be present at a particular user device 20 as shown in FIG. 5. A list of trusted and non-trusted people may be stored at data store 94.

This functionality may be implemented in embodiments as shown in FIG. 5 where software application 24 includes a safety (kids mode) module 58 having a safety mode algorithm 224, such as a safety (kid) mode algorithm 224. Safety mode algorithm 224 compiles data detected from video sensor 21, audio sensor 22, motion sensor 23 and/or other input devices to detect user presence at user device 20. Safety mode algorithm 224 controls, via user engagement computer system 10, whether the video chat session is established at all, or at least controls the functionality of the application, possibly offering only a subset of the fully functional system, in the absence of a trusted person. When user presence of a child is detected, safety mode algorithm 224 may determine whether a trusted person is present at one of user devices 20, 30. If not, safety mode algorithm presents a restricted UI 228 that may limit a feature or control of a user-controllable option such as by not permitting the establishment of a video chat session or only allowing for certain limited functionality during the video chat. However, when safety mode algorithm 224 detects the presence of a trusted person, a full function user interface (UI) 230 may be presented. For example, if a child wishes to open setting on a user device, a dialog box may be presented to an adult on the adult's user device prompting the adult to either approve or disapprove the child's access to the settings. If the adult approves, then the child may access settings. Other examples of limiting functionality of a user device associated with a child includes, for example, not permitting user engagement via a shared interactive digital screen or other enhanced video chat features (such as described below), or pixelating the video feed from a user device being used by a child user, or to name a few.

Safety mode algorithm 224 may also transmit data to a safety mode ML (machine learning) model 226 that captures information gleaned during safety mode operation and transmits this data to user engagement computer system 10 for use in formulating an improved online model for safety mode algorithm 224 for future video chat sessions.

User engagement computer system 10 can automatically determine whether a user is an adult or a child in one or more ways. One indicia that may narrow down the choice of users is to check who is logged into user engagement computer system 10. Also, measured characteristics of the user may be captured and processed, such as by using known facial recognition and voice recognition algorithms, such as those used for determining user presence. Visual characteristics/markers that can assist in identifying an individual user include, for example, facial recognition or measurement of a user's physical stature may be made using video sensors 21, 31 at respective user devices 20, 30. Audio characteristics/markers that can assist in identifying an individual user include measurements of the user's voice, including pitch (e.g., high pitch (child) vs. low pitch (adult)), frequency, timbre, vocabulary, diction, enunciation, touch patterns, cadence, footsteps pattern, and non-vocal sound patterns. Other user characteristics that may be taken into account are touch patterns of a user at input device 27 or on a touch display 29 on the user device. Other characteristics may also be relied on in an adult vs. child determination, such as, for example, the sophistication of drawings, animations, or other graphics that the user may have created at the user device. Also, user engagement computer system may checking on ownership of an email account associated with the user device where the email service provider require a certain minimum age to have an email account. These various characteristics may be used individually or in combination with each other and/or with other known information to identify whether a user is a child. The detection of a child may be aided by also detecting the presence of a known adult's voice, such as the voice of a parent. More than one audio, video and touch signals may be combined to create a confidence level to be determined by user engagement computer system 10 that, when reached, will allow the discernment between child and adult users. This discernment may be used for purposes such as automatically changing the schedule and automatically denying child users the ability to change the video chat schedule. Thus, user engagement computer system 10 will be able to determine via voice commands if a user is an adult or child and respond appropriately.

For example, user engagement computer system 10 may be able to distinguish between adult and child when a user recites the instruction to "Change schedule to wake at 4 p.m. on weekdays". If user engagement computer system 10 determines the voice is that of an adult, then user engagement computer system 10 will unlock the user device and change the schedule as requested. (For example, a parent who is an authorized administrative system user may authorize a change in schedule for a child user). If user engagement computer system 10 determines the voice to be that of a child, then the schedule may be left unchanged. In embodiments, user engagement computer system 10 is also able to unlock a particular user device if the adult is on the other side of the video connection. For example, if the child is video chatting with their grandparent at one user device, then the voice of the grandparent at the other user device will be registered as an adult and the adult will be able to make scheduling changes at the first user device. Thus, in embodiments, the physical proximity of the adult no longer becomes necessary; it is something that can be determined remotely and unlocked by the user on the other device even if far away.

In embodiments, user engagement computer system 10 may be further configured so that it does not permit a connection for a video chat session between user devices 20, 30 if the user presence data identifies one or more non-trusted users as being present at or near one of user devices 20, 30. Put another way, user engagement computer system 10 will not permit a connection if the user presence data does not indicate an "absence" of one or more non-trusted users. This control may or may not be implemented even where a trusted person is present at one of user devices 20, 30. For example, if user device 20, 30 with respective software application 24, 34 is in a home that is shared with a housekeeper, user engagement computer system 10 may be programmed to not allow a connection between user devices 20, 30 or to only allow a restricted user interface if user engagement computer system 10 detects that the housekeeper is home. (In embodiments, user participation in the video chats may be limited to those associated with the user devices, which may be tracked by user presence data as well.)

An additional advantage of compiling user presence data by the user engagement computer system 10 is that, in embodiments, the user presence data may be used to automatically download software updates to software applications 24, 34 on respective user devices 20, 30 if user engagement computer system 10 detects the presence at a first user device of an adult who is authorized to approve updates at that first user device or user engagement computer system 10 detects the presence at a second user device of an adult who is authorized to approve updates at the first user device when the second user device is in communication with the first user device.

An additional benefit of compiling user presence data by the user engagement computer system 10 is that, in embodiments, a user device may sound an alert and/or notify local police if an unknown individual is identified as being present at the user device without also being accompanied by a known user. Thus, in embodiments, user engagement computer system 10 may act as an in-home intelligent security camera.

In embodiments, user engagement computer system 10 may further use the user presence data to calculate meeting attendance, which may be useful in various contexts, such as where video chats are used in a business context. User engagement computer system 10 may use the compiled user presence data to identify who attended or did not attend a remote meeting or job and provide this information as a data feed for automatic entry to a time records database, for a listing to be provided to managers, or for other record-keeping purposes.

In embodiments, a video chat session may be ended manually or ended automatically or a particular party's participation may end in circumstances such as, for example, (1) no users are detected at one or more user devices; (2) a non-trusted user is detected at one of the user devices: (3) a disconnect instruction is received from one of the user devices; or (4) inappropriate language is detected during the video chat session, to name a few.

Figure 4B:
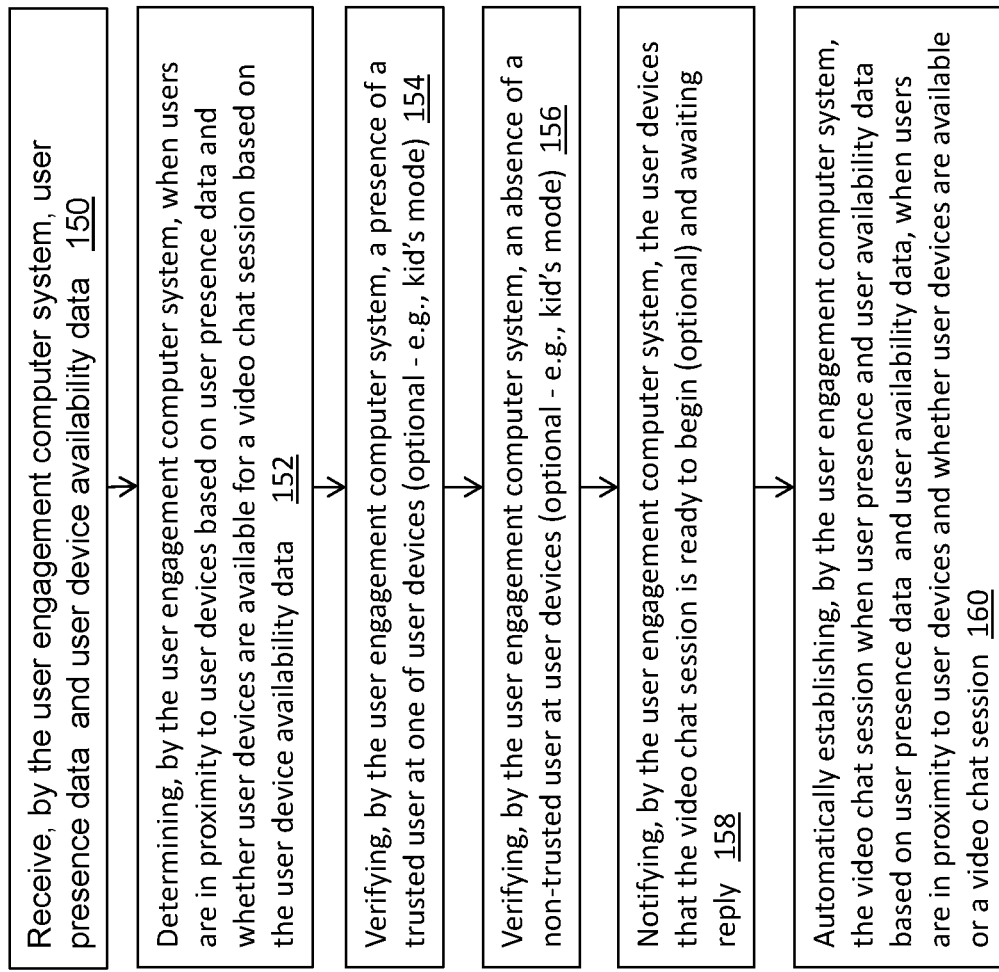
FIG. 4B is a flow chart that illustrates a method for determining a user presence at each of the user devices in connection with the establishment of a video chat session in accordance with an embodiment of the present invention.

FIG. 4(b) shows a flow chart of the steps for the automatic establishment, by a user engagement computer system, of a video chat session between at least two user devices in communication with the user engagement computer system 10 without a user instruction in accordance with an embodiment of the present invention. At step 150, user engagement computer system 10 receives user presence data and user device availability data. At step 152, user engagement computer system 10 determines when users are in proximity to user devices based on user presence data and determines whether user devices are available for a video chat session based on user device availability data. At step 154, which is optional and may be performed, for example, when kid's mode is activated, user engagement computer system 10 verifies a presence of a trusted user at one of user devices At step 156, which is optional and may be performed, for example, in kid's mode, user engagement computer system 10 verifies an absence of a non-trusted user at the user devices. At step 158, user engagement computer system 10 may notify the user devices that the video chat session is read to begin and may also await a reply from each user device, such as a command to proceed. The notification may be, for example, triggering a sound at the user device, sending a text message, or providing an operating-system level message that the video is going to start soon.

Thus, in accordance with an embodiment of the present invention, a computer-implemented method is disclosed for a user engagement computer system to automatically establish a video chat session between two or more user devices in communication with the user engagement computer system without a user instruction to establish the video chat session, wherein the two or more user devices are each associated with a different user and each has a respective audio sensor, a respective video sensor, a respective motion sensor, and an interactive audiovisual player. The method includes the steps of: (a) receiving, by the user engagement computer system, (i) user presence data from each of the two or more user devices obtained by the respective audio sensor, the respective video sensor, and the respective motion sensor, and (ii) user device availability data for each of the two or more user devices; (b) determining, by the user engagement computer system, when the respective users are in proximity to the respective two or more user devices based on the received user presence data, and determining, by the user engagement computer system, whether the two or more user devices are available to establish the video chat session between the two or more user devices based on the user device availability data; and (c) automatically establishing, by the user engagement computer system, the video chat session when the user presence data and the user device availability data for each of the two or more user devices indicates that the two or more user devices and the respective users associated therewith are available for the video chat session. In embodiments, the user presence data that is received by the user engagement computer system from a respective user device of the two or more user devices includes audio, video, or motion data detected by the respective user device. In embodiments, the user device availability data that is received by the user engagement computer system from a respective user device of the two or more user devices includes data that indicates whether the respective user device is available for a video chat. In embodiments, one or more of the two or more user devices are mobile devices.

In embodiments, a first user device of the two or more user devices is associated with a first user, and the method further includes: (d) verifying, by the user engagement computer system before automatically establishing the video chat session, a presence of a trusted user associated with the first user at at least one of the two or more user devices to be included in the video chat session such that the video chat session is only automatically established in the presence of the trusted user. In embodiments, the first user is a child and the trusted user is an adult. In embodiments, the method further includes: (d) verifying, by the user engagement computer system before automatically establishing the video chat session, an absence of a non-trusted person at the two or more user devices.

In embodiments, the method for automatically establishing the video chat session includes: (d) notifying, by the user engagement computer system of the two or more user devices to be included in the video chat session, that the video chat session is ready to begin before automatically establishing the video chat session. In embodiments, the method also includes (d) tracking, by the user engagement computer system, user participation in the video chat session.

In embodiments, where a first user device of the two or more user devices is associated with a child, the method further includes: (d) detecting, by the user engagement computer system a presence of an unknown person in a vicinity of the child in the absence of a trusted user before automatically establishing the video chat session; and (e) transmitting a notification to an administrative system user upon detection of the presence of the unknown person.

Also, in embodiments, the method further includes: (d) accepting, by the user engagement computer system, an authorization by an adult user associated with a first user device of the two or more user devices to update an application on a second user device of the two or more user devices that is associated with a child.

In embodiments, the method further includes: (d) automatically determining, by the user engagement computer system using the received user presence data, whether the first user device of two or more user devices is associated with a child; and (e) automatically limiting, by the user engagement computer system, a feature or control of a user-controllable option by the first user device upon a determination that the first user device is associated with the child. In embodiments, the step of automatically limiting, by the user engagement computer system, control of a user-controllable option by the first user device upon a determination that the first user device is associated with the child includes overriding the limitation, by the user engagement computer system, of the user-controllable option upon receiving authorization from a trusted user at one of the two or more user devices.

In embodiments, the user presence data includes data that reflects at least one user-specific biometric identifier, and the automatic determination, by the user engagement computer system using the received user presence data, as to whether the first user device of two or more user devices is associated with an adult or child includes comparing the at least one user-specific biometric identifier with a reference database of biometric identifiers. In embodiments, the at least one user-specific biometric identifier is selected from a group of biometric identifiers including a user's voice, pitch, frequency, timbre, vocabulary, diction, enunciation, physical stature, facial features, touch patterns, cadence, footsteps pattern, non-vocal sound patterns, and user movements.

In embodiments, the second user device of the two or more user devices is associated with an adult, and wherein the second user device is configured to remotely change user control options for the first user device. In embodiments, the user control options include an option to change a video chat schedule.

State Machine

As noted above, prior art video chat systems have user interfaces that are static such that either they do not change in response to user interaction with the video chat system or only allow for pre-programmed changes that are set to change at specific times. This is because prior art video chat software do not implement state machines.

To overcome this shortcoming of prior art video chat systems, in embodiments, a video chat system incorporates a state machine, which responds to changes from non-user initiated actions. FIGS. 6A, 6B, 6C, and 6D show an example of the various states and changes between states that are possible at user engagement computer system 10. In embodiments, the state machine of user engagement computer system 10 uses state machine module 56 to establish a video chat connection without direct interaction from the user. This means that the video chat application changes state primarily in response to scheduled events (e.g., a scheduled video play time at which video play is activated), pushes from the server, and partner status changes (i.e. status of another paired device) rather than primarily in response to direct user instruction. (An example of a partner status change is where the other paired user device loses Internet connectivity or WiFi connectivity.) Rather than spreading the logic that responds to these asynchronous video chat events across multiple screens and activities in the video chat application, which is cumbersome and may be error-prone, using a state machine allows these asynchronous events and transition between application UI states to be centrally handle this critical logic in one place. This also enhances testability of the UI and reduces hard-to-fix state change bugs and race conditions.

Thus, in accordance with an embodiment of the present invention, a computer-implemented method is disclosed for automatically establishing, by a user engagement computer system operatively connected to a state machine, a video chat session between two or more user devices in communication with the user engagement computer system to establish the video chat session without a user interaction, wherein the two or more user devices are each associated with a different user. The method includes the steps of: (a) receiving, by the user engagement computer system, a notification of a change in application state at the state machine that requires the establishment of a video connection between the two or more user devices; and (b) automatically establishing, by the user engagement computer system, the video chat session between the two or more user devices upon receipt of the notification of the change in the application state. In embodiments, the change in the application state occurs in response to one of a scheduled event, a push from user engagement computer system, or a status change at one of the two or more user devices (partner status change).

Active Measurements of Video Chat Sessions

Another feature that may be implemented separately or combination with other features of the invention is actively recording measurements of different parameters related to the users during a video chat session.

As mentioned above, in order to further encourage and enhance user engagements during video chats, it is desirable to be able to actively measure various video chat-related parameters. These parameters may be different from those used to discern particular users for user presence at the user engagement computer system 10. If user devices participate in a video chat session, it is known to capture certain metadata about the video chat session, such as start time, end time, user profiles associated with the user devices that were involved in the chat, how often users are using masks or filters, to name a few. However, there has been heretofore no way for a computer system to ascertain exactly how often and for how long users are actually speaking to each other using the user devices.

Figure 7A:
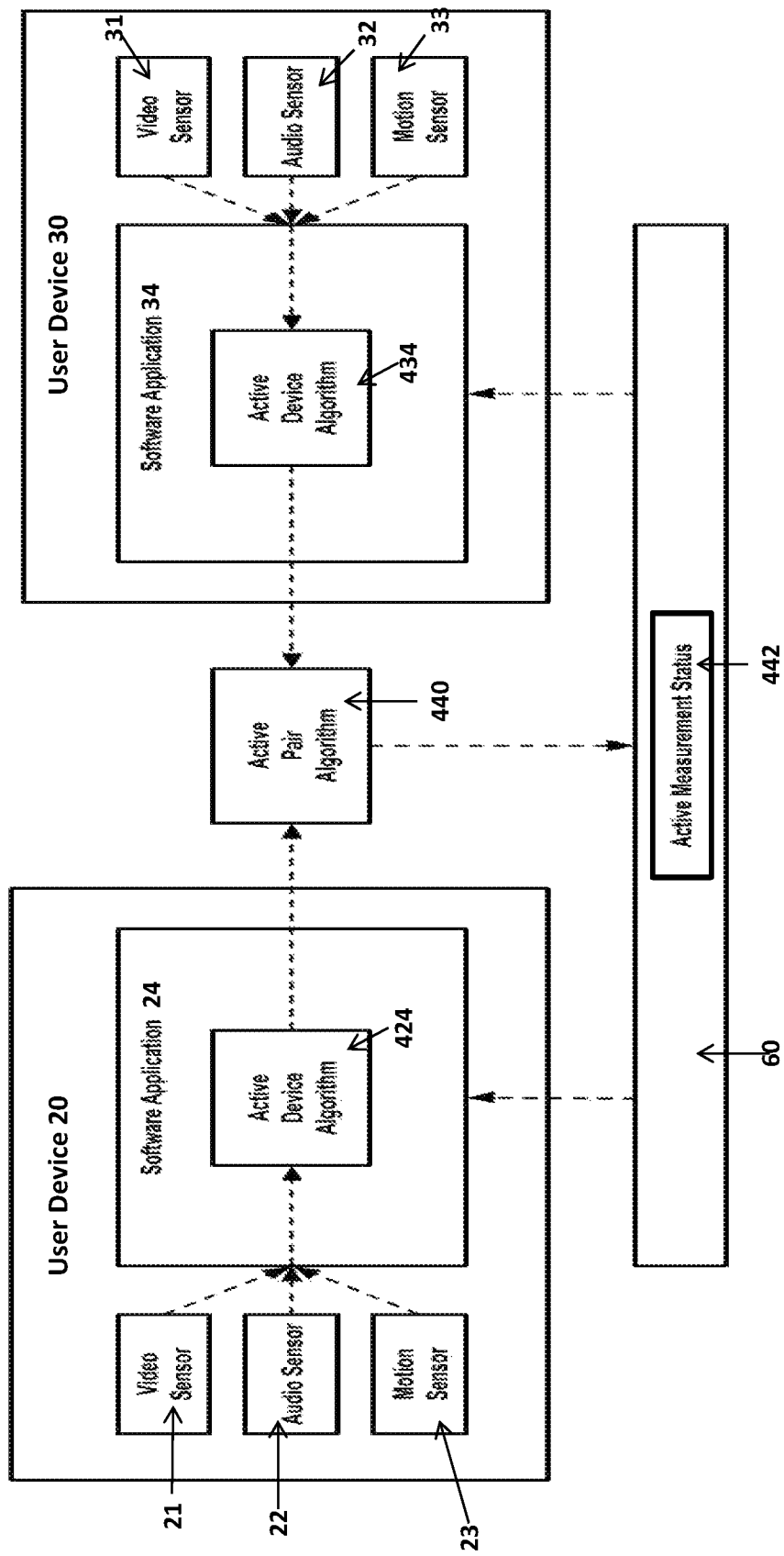
FIG. 7A illustrates a system in which the user engagement computer system communicates with the user devices for measuring user device interactions in accordance with another embodiment of the present invention.

User engagement computer system 10 in accordance with an embodiment of the presentation addresses this issue using an active measurement module 60 (see FIG. 2) that communicates with user devices e.g., user devices 20, 30, and determines whether these user devices that are physically separated from each other are actively engaging, e.g., speaking, with one another and, if so, measures the length of the active engagement. Active measurement module 60 may actively capture measurements that may be used to further engage users via the user devices and to enhance communications. As shown in FIG. 7A, to perform active measurements, each user device that participates in active measurement also include an active device algorithm, e.g. 424, 434, within respective software application 24, 34 that communicates with active measurement module 60. Active measurements are captured by active device algorithm 424, 434 and transmitted to active measurement module 60 during an active video chat session.

Examples of active measurements that may be taken at each user device 20, 30 by active device algorithm 424, 434 include the following three measurements that may be taken at user devices 20, 30: (1) audio measurements associated with user speech, such as measurements of amplitude and/or frequencies of sounds made by each user at each of the two user devices using, for example, audio sensors 22, 32; (2) measurements of user device movements as detected by whether or not a device's gyroscope (e.g., motion sensor 23 or 33, which measures physical movement) is triggered and to what extent; and (3) measurements of object movement that transpire in front of a camera (as detected, for example, by video sensor 21 using video buffering) thus requiring it to redraw pixels on the screen. The ongoing readings of these and other types of actively measured data may be tracked and used to derive whether or not people are using the user device, and/or whether or not conversation is occurring.

Figure 8:
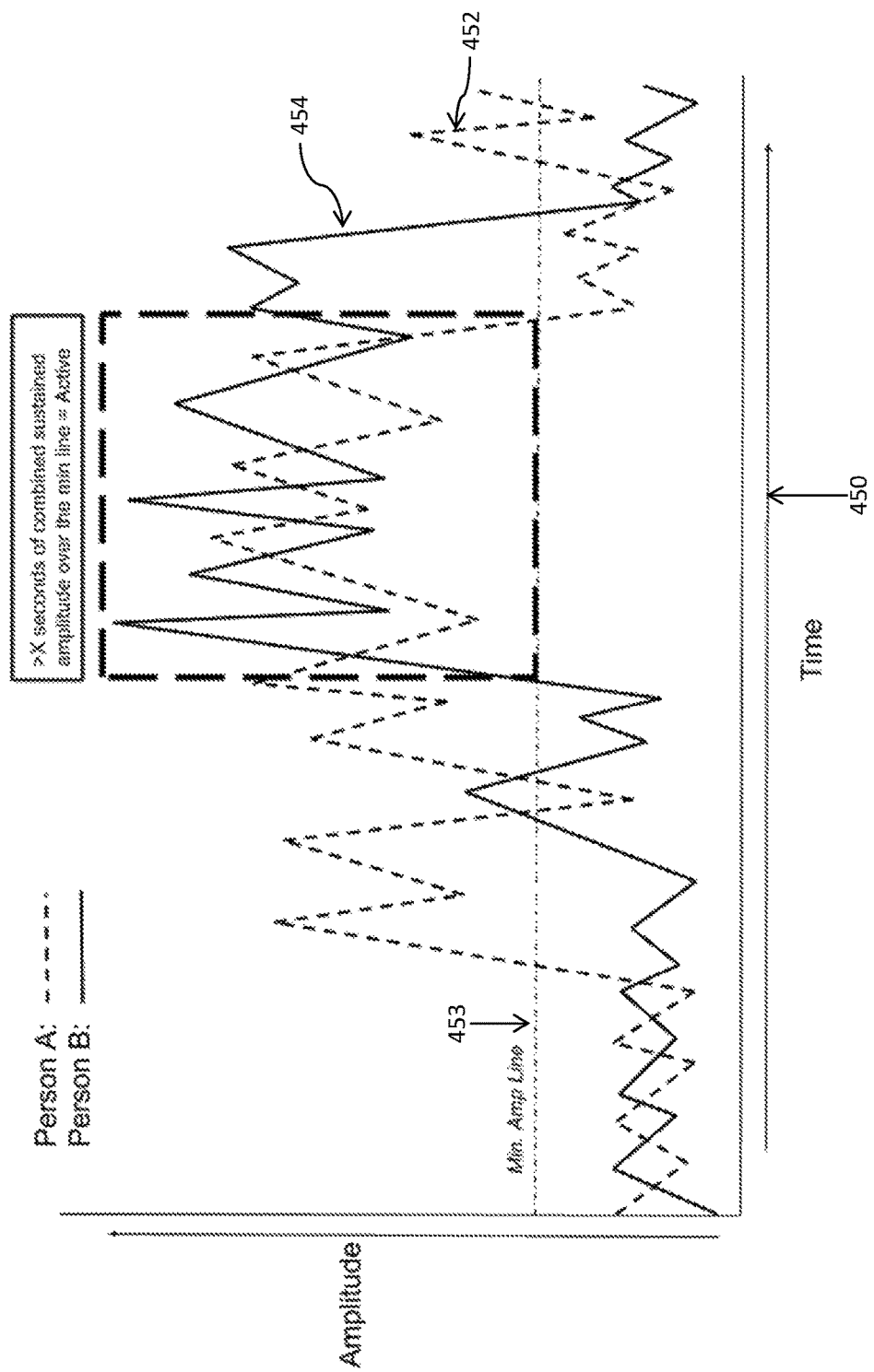
FIG. 8 illustrates a graph showing one method in accordance with an embodiment of the present invention for measuring user device interactions.

FIG. 8 shows graphically an example of active measurements of sound at user devices 20, 30 in a situation where person A is associated with one of the user devices and person B is associated with a second of the user devices. Graph 450 shows the detected sound amplitude 452 for person A and 454 for person B over time for each detected user. In embodiments, user engagement computer system 10 determines active conversation to be occurring when a sound amplitude detected at both user devices meets or exceeds a threshold, such as a predetermined minimum amplitude, represented by minimum amplitude line 453, and exceeds a predetermined duration of "X" seconds of combined sustained amplitude over the minimum amplitude. Additionally, motion and video activity may be similarly detected and tracked at user engagement computer system 10 to determine amplitude and/or duration of those signals above a threshold minimum level of amplitude/duration.

Measurements of the duration of actual conversation may be used by user engagement computer system 10 in various ways. For example, in embodiments, where only short conversations are detected, user engagement computer system 10 may suggest to the users additional collaborative activities that encourage further user engagement or may automatically schedule additional video chat sessions for the user devices also to encourage further user engagement with one another.

The threshold amplitude and duration that is selected for active measurement by user engagement computer system 10 may be selected so as to filter out ambient sounds and other sounds such as sounds by only one user which may indicate that a conversation is happening in the background at one of the devices. Ambient noise may also be detected by active measurement module when the measured sounds do not fit human-style sound patterns. The sounds that are not typically made by humans may also be filtered out by user engagement computer system 10.

The active measurement module 60 thus, in embodiments, provides an algorithm that may be used to mitigate ambient noises like street traffic or background television to ensure the sounds of live human users are transmitted clearly. This feature may be performed with or without recording any personally identifiable information. Additionally, in embodiments, other background sounds that start and stop periodically, such as sounds of an occasional siren, may be measured and filtered out or eliminated by sound cancelation as well to improve the sound quality.

In embodiments, active measurement module 60 may also be used to compile metrics on usage and childhood development by analyzing speech from audio sensors 22 or 32. For example, active measurement module 60 may be used to develop a voice profile of a specific user such as a child who uses one of user devices 20, 30, and/or it may be used to measure how long the child spoke with a relative, such as grandpa, in a given time period, and provide that session length to parents to inform them of video chat usage.

Another use of active measurement module 60 is to capture metrics on child's communication skills via expanded vocabulary, including a rate of development, to present this data to parents. Yet another use of active measurement module 60 is to compile statistics that compare a child's level of improvement against averages, percentiles, or other measurements for children overall in a given age range and provide that data to parents.

Additionally, sounds may be filtered out based on visual signals as obtained by video sensors such as video sensors 21, 31. For example, if the video sensors 21, 31 detect that a user is going to turn on a vacuum or another noisy gadget, user engagement computer system 10 can anticipate the sound and suppress the sound preemptively before it is heard acoustically.

The improvement of sound quality may encourage user engagement as users who have a poor connection, with poor sound or video quality, may be quicker to terminate a video chat session, whereas a better connection will allow users to spend more quality time engaged in a video chat.

Figure 7B:
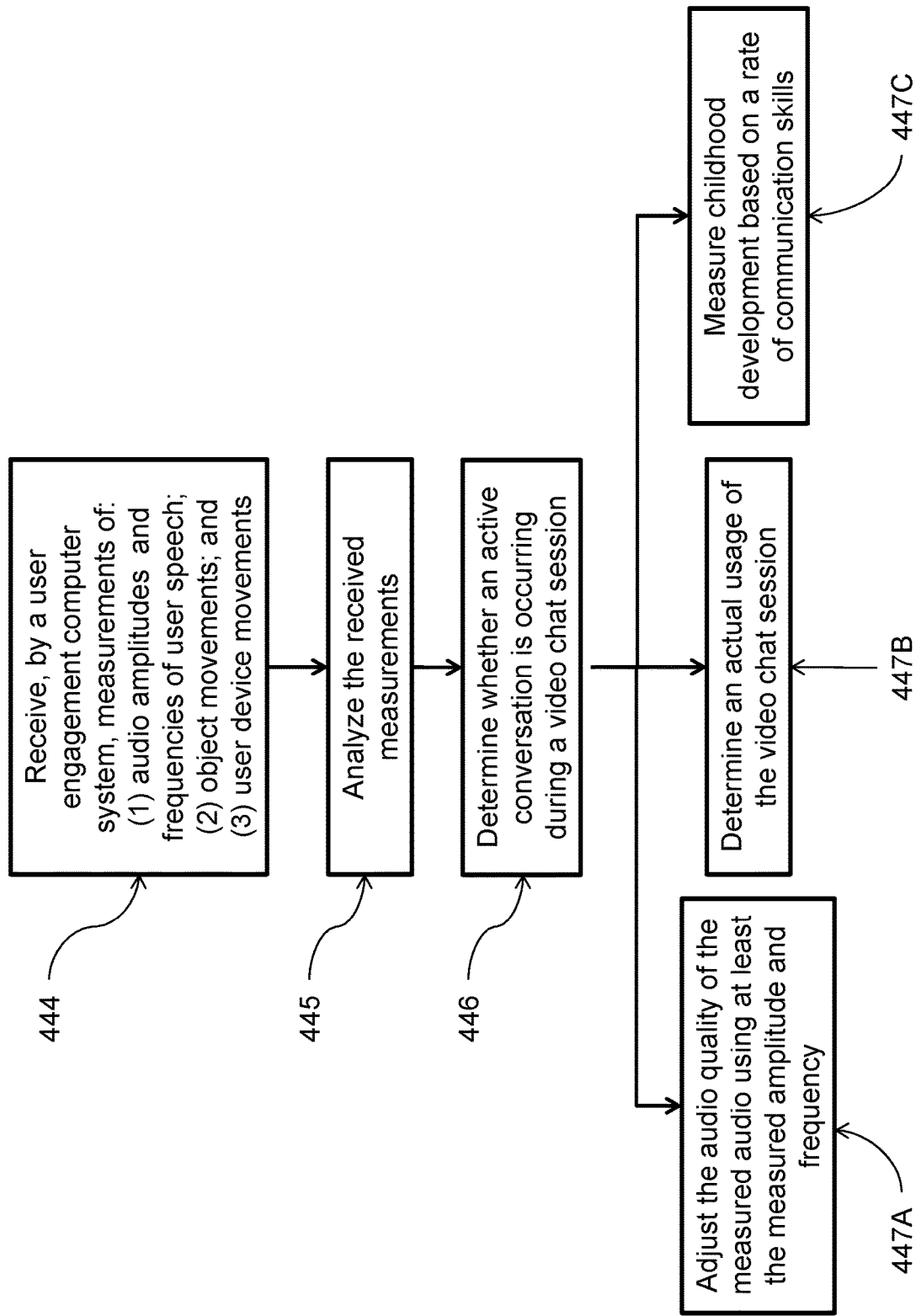
FIG. 7B is a flow chart that illustrates a method for measuring user device interactions between the user devices using the user engagement computer system in accordance with an embodiment of the present invention.

FIG. 7B is a flow chart that illustrates exemplary embodiments of a method for measuring user device interactions between the user devices using the user engagement computer system 10 in accordance with an embodiment of the present invention. At step 444, user engagement computer system 10 receives the measurements obtained by an active device algorithm at a user device, including audio amplitudes and frequencies of user speech, object movements, and user device movements. At step 445, the received measurements are analyzed by user engagement computer system 10. At step 446, user engagement computer system 10 determines whether an active conversation is occurring during a video chat session based on the analyzed measurements and, if so, at step 447, an action may be taken based on detection of an active video chat. The action may be, for example, (1) adjusting, by user engagement computer system, the audio quality of the measured audio (step 447A), (2) determining, by user engagement computer system, an actual usage of the video chat session (step 447B), or (3) measuring, by user engagement computer system, childhood development of a child based on a rating of communication skills that is measured (step 447C).

Thus, in an embodiment in accordance with the present invention, a computer-implemented method is disclosed for automatically determining, by a user engagement computer system, whether an active conversation is occurring during a video chat session between two or more user devices in communication with the user engagement computer system, wherein the two or more user devices are each associated with a different user and each has a respective audio sensor, a respective video sensor, a respective motion sensor, and an interactive audiovisual player. The method includes the steps of (a) receiving, by the user engagement computer system, (i) audio measurements associated with user speech, including amplitudes and frequencies of user speech as measured by the respective audio sensor at each of the two or more user devices; (b) analyzing, by the user engagement computer system, the received audio measurements, to determine whether an active conversation is occurring during a video chat session; and (c) performing, by the user engagement computer system in connection with the video chat session, at least one of: (I) adjusting, by the user engagement computer system during the video chat session, the audio quality based at least on the audio measurements to improve sound clarity by mitigating ambient noise; (II) determining, by the user engagement computer system, actual usage of the video chat session by the users; or (III)

measuring, by the user engagement computer system, childhood development based on a rate of a child user's communication skills. In embodiments, the audio amplitudes and frequencies are measured when the amplitudes over a predetermined time exceed a minimum amplitude threshold. In embodiments, the method further comprises receiving, by the user engagement computer system, at least one of (ii) object movement measurements as detected by the respective video sensor at each of the least two user devices; and (iii) user device movement measurements that reflect user device movements of each of the two or more user devices as measured by the respective motion sensor at each of the least two user devices, and the determination, by the user engagement computer system, actual usage of the video chat session by the users is based on the audio measurements in combination with at least one of the object movement measurements and the user device movement measurements.

Shared Reading Experience/Visual Storytelling During Video Chat Sessions

As discussed above, another shortcoming of prior art video chat applications is that these applications do not present an opportunity to share a copy of a book or other publication even in electronic form. Thus, a book, such as an e-book, or other publication may only be electronically available to one particular user device at a time so that an individual may only read the book or publication on his or her own user devices. The publication or book cannot be enjoyed by two users using two separate user devices concurrently. If two users want to read a publication or book together who are not near each other, one user has to read aloud to the other remotely located user.

To resolve this shortcoming, in embodiments, user engagement computer system 10 may present a shared interactive digital screen that displays the same graphics on at least user devices 20, 30 such that user interactions with the shared interactive digital screen on one user device are shown substantially in real-time on the other user device. Thus, described below with reference to FIG. 10A, the single copy of a book or publication may be viewed by two or more participants in the video chat.

Another solution, in embodiments, is to have user engagement computer system 10 automatically generate one or more illustrations/"supplementary video segments" when a user at a first user device that is participating in a video chat session, via user engagement computer system 10, reads aloud a story, such as from an e-book, a print copy of a book or an electronic or print copy of a publication. These supplementary video segments may include one or more images, animations, or drawings that depict a storyline that is related to the words or phrases spoken during the video chat session. The supplementary video segments are generated by visual storytelling module 62 so that the story may be shown visually on a display at the second user device participating in the video chat sessions. This allows the story to come alive at the second user device for a user to appreciate even where the actual book is not viewable or when the user of the second user device is unable to read the book. Thus, for example, a grandparent at the first user device may read a book at a first user device and a young child at a second user device can view the supplementary video segments while listening to the grandparent read the story. In embodiments, the automatically generated illustrations are also displayed at the first user device. In embodiments, the publication or book to be read may be stored at user engagement computer system 10 or at one of the user devices 20, 30 and possibly within the respective software application 24, 34 that interacts with user engagement computer system 10.

Figure 9A:
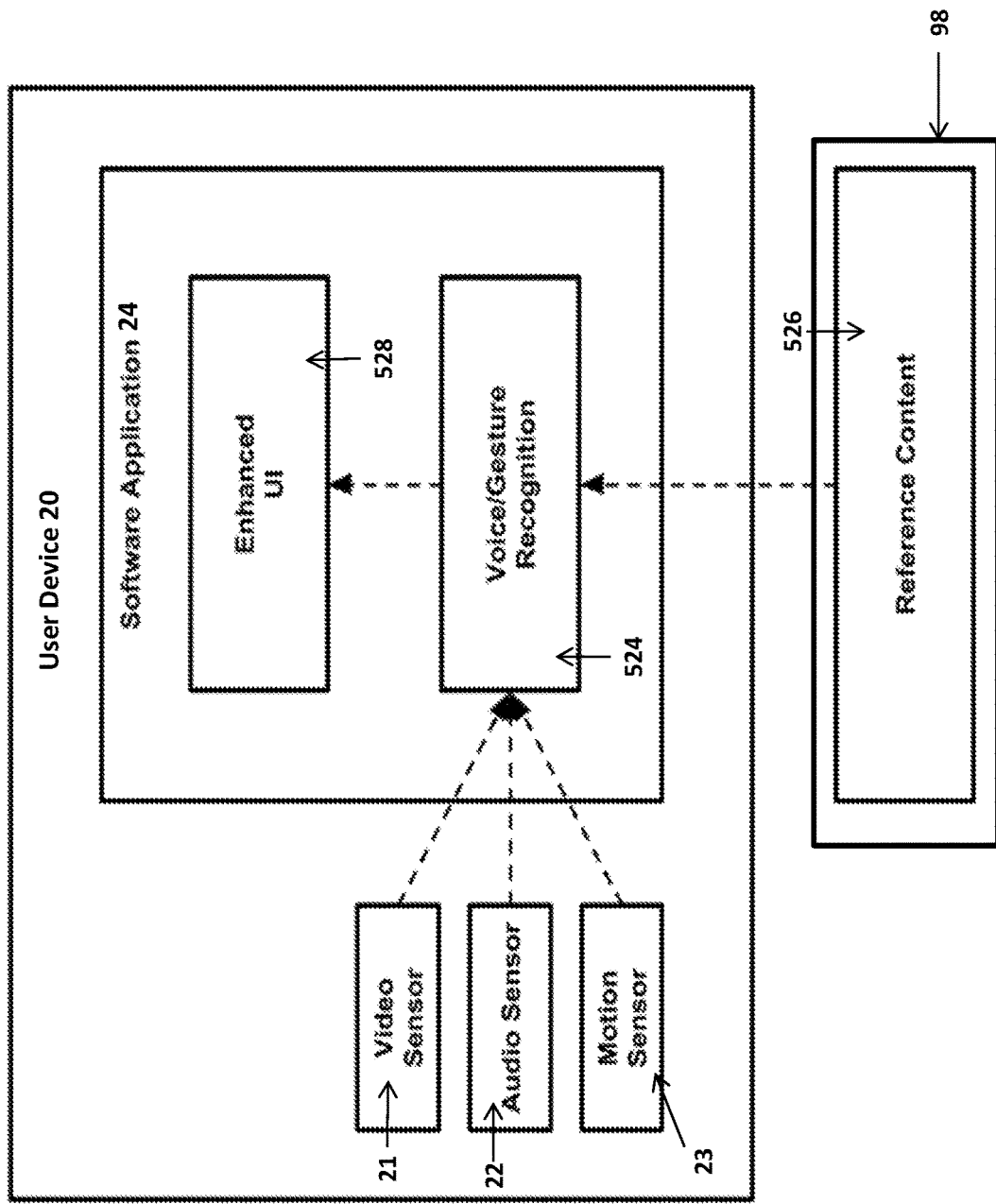
FIG. 9A illustrates a system in which the user engagement computer system provides a visual storytelling application for user devices in accordance with an embodiment of the present invention.

Referring to FIG. 9A, a system in an embodiment of the present invention for automated illustration of spoken content, such as reading of content from books or publications, includes (1) user engagement computer system 10 that has a visual storytelling module 62 and a content database 526 (which may be part of book reference content data store 86) to compare the detected words or phrases with reference content in content database 526 that is stored in non-transitory computer-readable memory that is operably connected to the user engagement computer system, wherein the content database includes a compilation of textual or audio content and video content related to the textual or audio content; and (2) two or more user devices each have a video sensor, audio sensor, motion sensor, and a software application for visual storytelling. In embodiments, reference content for multiple books and/or publications may be stored in database 526. This data may be compiled by an operator of user engagement computer system 10 or may be obtained electronically from one or more third party servers (not shown).

FIG. 9A illustrates one of the user devices 20 with video sensor 21, audio sensor 22, motion sensor 23, and software application 24; other user devices participating in the video chat session, such as user device 30, may be similarly equipped. Software application 24 includes a voice and gesture recognition application 524 that interacts with content database 526 to automatically recognize the detected voices and gestures and an enhanced user interface (UI) 528, such as a touch screen, at which a user may enter additional detail in addition to the automatically generated visual content. Thus, words spoken at one user device, for example user device 20, may be illustrated with supplementary video segments at user device 30 or vice versa.

Figure 9B:
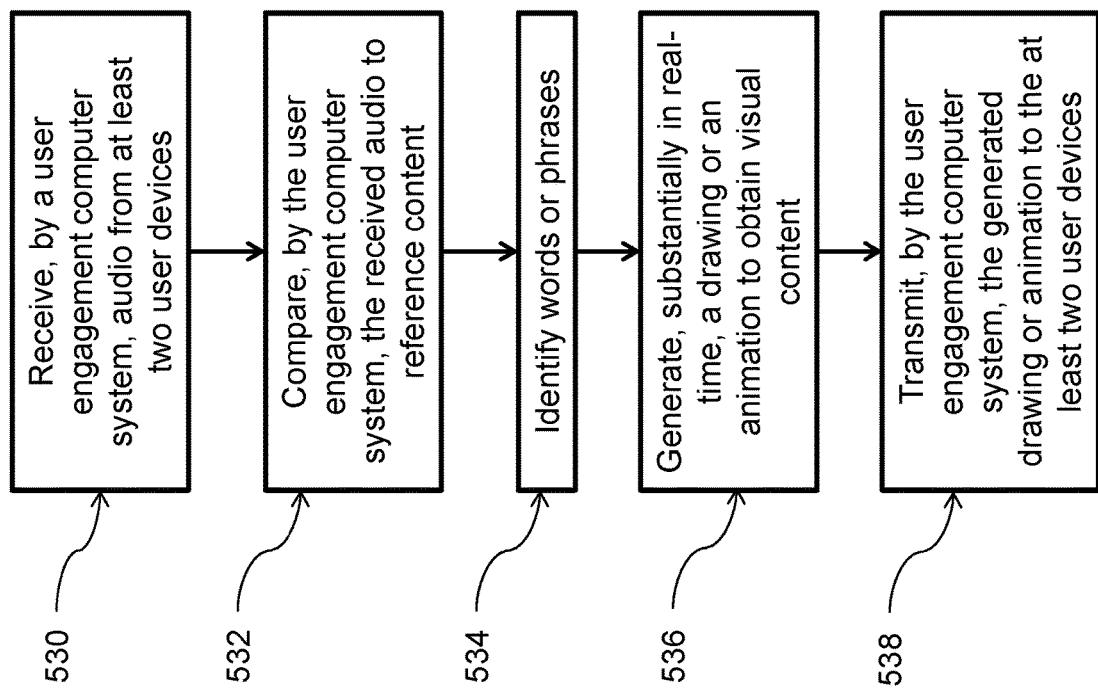
FIG. 9B is a flow chart that illustrates a method for the visual storytelling application using the user engagement computer system in communication with the user devices in accordance with an embodiment of the present invention.

FIG. 9B shows a flow chart that shows exemplary steps for an algorithm for performing visual storytelling in accordance with an embodiment of the present invention. When the visual storytelling feature is activated during a video chat session, at step 530, user engagement computer system 10 listens for audio input from a user device, e.g. user device 20, and compares the received audio against words or phrases in content database 526. At step 534, user engagement computer system 10 identifies any recognized words or phrases in the audio input based on a match of words or phrases to obtain a confidence score that reflects how closely the detected sounds match the words or phrases content database 526. At step 536, visual storytelling module 62 draws/animates relevant content corresponding to the recognized words or phrases, such as content that related to the story line visually substantially in real-time (i.e. substantially at the time that the words or phrases are spoken). Then, at step 538, user engagement computer system 10 transmits this content to user devices 20, 30 for display on one or more of the user devices to create a composite auditory and visual experience that is compelling and engaging for both the reader and the listener. In embodiments, the illustrated content may be directly related to the story line, while in other embodiments the illustrated content may include content that is more tangentially related to the storyline such as scenery. When desired, a user, via a user device, may instruct that the visual storytelling, including the supplemental video be turned off.

As an example of visual storytelling, if user device 20 detects that a user describes a frog in the story, user engagement computer system 10 transmits a graphic of a frog to be displayed at user device 30 and at user device 20. Likewise, if user device 20 detects that a user describes a princess in the story, user engagement computer system 10 transmits a graphic of a princess to be displayed at user device 30 and at user device 20.

Additionally, in embodiments, multiple supplementary video elements/graphics may be simultaneously displayed or may be displayed overlapping in time. For example, where the storyline involves a princess, married to a prince who turns into a frog that then hops away, the graphics may first show a princess when the word "princess" is mentioned. Then, a prince is added to the display when the word "prince" is mentioned. When the reader reads that the prince turns into a frog, the graphic shows the prince changing into a frog. This is followed by a graphic of the frog hopping off-screen.

In embodiments, where user content database 526 contains the contents of multiple books and publications, at step 534, the detected words and phrases and parsed order of the words and phrases may also be used by user engagement computer system 10 to determine what specific book or publication is being read. In embodiments, the multiple books and publications that are ingested may include popular books and publications, such as popular children's books. In this case, user engagement computer system 10 may obtain existing animations and graphics from known books, where copyrights permit, to add to the automated illustrations. Thus, visual storytelling mode allows for the presentation of rich animations and graphics to users of the user devices as stories are being read aloud. Again, this presents another opportunity for further user engagement using user devices.

Thus, user engagement computer system 10 will work together with applications on user devices 20, 30 to listen to and identify which title is being read and to animate it in a specific way (such as, for example, with actual illustrations from a publication or book when the publication or book has been ingested and stored in user content database 526) or in a generic way using generic illustrations/animations (regardless of whether the book has been ingested and stored at user at database 526).

Visual storytelling module 62 may also be used to generically illustrate conversations/stories conveyed orally (without reading any specific publication or book) to provide illustrations based on identification of words or phrases in the conversations/stories that have corresponding words or phrases and illustrations stored in user content database 526.

In embodiments, a mention of music or a specific musical composition may cause user engagement computer system 10 to generate a graphic showing music or the specific musical composition. Moreover, in embodiments, content database 526 may also contain data for audio works, such as musical compositions, In these embodiments, user engagement computer system 10 may be further configured to use the detected audio to cause the playing of musical notes or the specific musical composition.

Thus, a computer-implemented method in accordance with an embodiment of the present invention automatically provides, by a user engagement computer system, images related to audio detected during a video chat session between two or more user devices in communication with the user engagement computer system, wherein the two or more user devices are each associated with a different user and each has a respective audio sensor, a respective video sensor, a respective motion sensor, and an interactive audio-visual player, the method comprising the steps of: (a) automatically detecting, by the user engagement computer system, words or phrases that are spoken during the video chat session; and (b) transmitting, by the user engagement computer system to the two or more user devices, supplementary video elements related to the detected words or phrases to be displayed in a portion of the screen at the two or more user devices during the video chat session. In embodiments, the method is performed substantially in real-time.

In embodiments, the supplementary video segment to be transmitted comprises one or more images, animations, or drawings that depict a storyline that is related to the words or phrases spoken during the video chat session. In embodiments, multiple supplementary video segments may be displayed substantially at the same time or overlapping in time.

In embodiments, the method further comprises: (c) transmitting, by the user engagement computer system to the two or more user devices, supplementary audio elements related to the detected words or phrases to be displayed in a portion of the screen at the two or more user devices during the video chat session. In embodiments, the supplementary audio elements comprise music.

In embodiments, the method in accordance with an embodiment of the present invention, further includes selecting, by the user engagement computer system, the supplementary video segment to be transmitted by the user engagement computer system to the two or more user devices, comprising the steps of: (i) comparing the detected words or phrases with reference content in a content database that is stored in non-transitory computer-readable memory that is operably connected to the user engagement computer system, the content database comprising a compilation of textual or audio content and video content related to the textual or audio content; (ii) identifying a first portion of the textual or audio content that is identical or similar to the detected words or phrases; and (iii) selecting a second portion of the video content that is related to the first portion of the textual or audio content for transmission by the user engagement computer system to the two or more user devices.

Shared Digital Interactions

Prior art video chat applications do not integrate within the video chat display productivity applications, like a word processor or a game, for real-time digital information exchange between two user devices who are not near each other. Rather, in the prior art, users launch non-video chat applications to digitally interact with user devices such as computing productivity applications (such as, for example, Google Docs) and interactive games (such as, for example, the game of "World of Warcraft"). These non-video chat applications, such as a game application, may allow for a limited video chat option with a display in the corner of the screen within the game application, generally to have discussions about the game, or a video chat application has to be separately launched. Thus, if users want to simultaneously communicate by video and interact digitally, prior art user devices would have to simultaneously manually launch a live video connection and a distinct other application, such as a document or game or launch a non-video chat application that has some limited video chat functionality. However, this lack of full integration presents a problem in that separately running video and other digital interactive applications on user devices introduces a time lag between the video and other application or may cause a distraction to the users of the user devices.

Figure 10A:
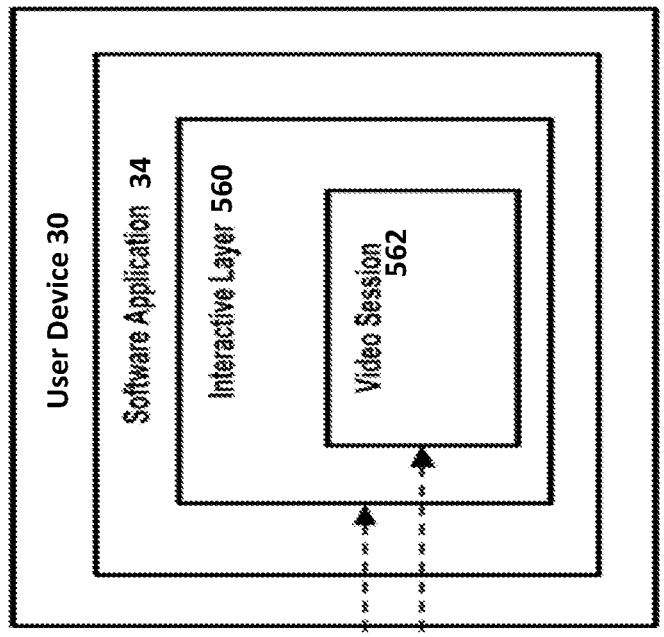
FIG. 10A illustrates a system for establishing shared digital interactions between user devices during a video session in accordance with an embodiment of the present invention.
Figure 10A:
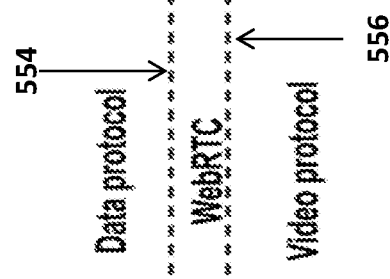
Figure 10A:
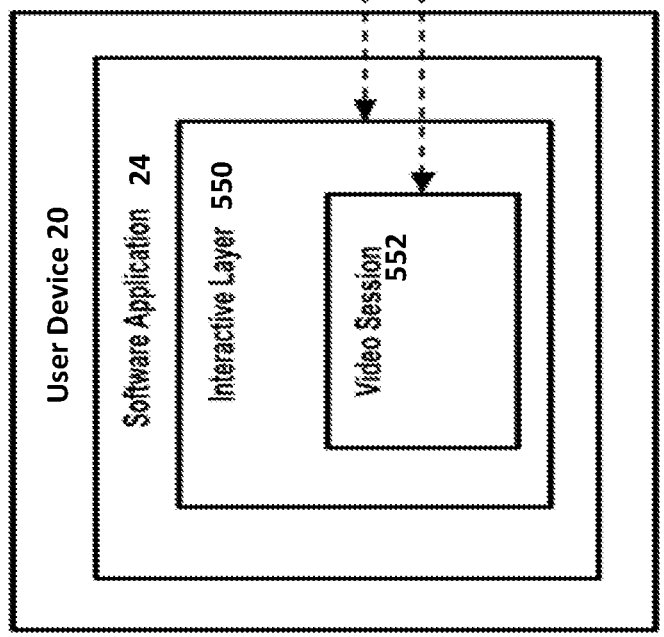

To solve this problem, referring to FIG. 10A, user engagement computer system 10 in accordance with an embodiment of the present invention has a shared digital interactions module 64 (FIG. 2) that interacts with an interactive layer 550 on user device 20 within software application 24 and an interactive layer 560 on user device 30 within software application 34. In embodiments, the shared interactive digital screen is presented as an overlay on top of video of the video chat session on the respective display of the respective user device, upon request at the user device, where the overlay is partially transparent and partially opaque, such that the video of the video chat and the shared interactive digital screen are displayed and viewable simultaneously on the same respective display and may cover the full display or less than the full display on the user device.

The shared digital interactions module 64 is configured to allow for two or more users of separate user devices 20, 30 to use one integrated video chat application to conduct a video chat session between user devices 20, 30 while, at the same time, user devices 20, 30 may interact with one another on a common digital surface, a "shared interactive digital screen", that appears substantially simultaneously on displays of each of the separate user devices 20, 30, that may be physically located apart from each other. The shared interactive digital screen may be used, for example, to collaborate on computing productivity applications or interactive games. The interactive games may offer educational activities related to, for example, reading, mathematics, art, or other educational pursuits. As shown in FIG. 10A, the interactive layer 550, 560 at respective user devices 20, 30 communicate via data protocol 554 while a video chat session 552, 562, operating within the respective interactive layers 550, 560, communicate with a video protocol, such as WebRTC (web Real Time Communications), an open project that provides browsers and mobile applications with RTC capabilities via simple APIs.

As a shared interactive digital screen, a change made to this shared interactive digital screen at one user device is display substantially simultaneously at the one or more other user devices. This interaction makes it possible to manipulate a digital experience with users of both user devices 20, 30 seeing the same shared interactive digital screen while concurrently seeing and hearing one another for the video chat. Consequently, the quality of the user device interaction and the output of the collaboration are improved, which, in turn, increases the satisfaction experienced by the users of the user devices 20, 30 and actively encourages engagement via an integrated video chat application in accordance with an embodiment of the present invention.

In embodiments, input device 27 at user device 20 and/or a display 29 on user device 24 may be a touch screen that may be used by a user to interact with the shared interactive digital screen as displayed on user device 20. Similarly, user device 30 may have an input device and/or a display that is a touch screen for a user of user device 30 to interact with the shared interactive digital screen as displayed on user device 30, which is the same as the shared interactive digital screen that is displayed on user device 20.

The shared interactive digital screen may be implemented on a user device when a user activates the feature at a user device. For example, with reference to user device 20, the feature may be activated when a user taps a button, such as at input device 27 or on the touch screen during a video chat session. User engagement computer system 10 provides the shared interactive digital screen and software application 24 may present the shared interactive digital screen on user device 20. The shared interactive digital screen may be presented in various ways. In embodiments, the shared interactive digital screen may be as a "Frost mode" in which the shared interactive digital screen is displayed with a frosted but transparent background and is overlaid on the video of the video chat session that is displayed on display 29 so that the video of the video chat session remains visible through the frosted background. As another example, in embodiments, the activation of the shared interactive digital screen may present a substantially transparent screen with a color scheme, e.g., with foreground or background colors, or graphics that allow the user to visually discern the difference between the video chat session and the shared interactive digital screen. A user at user device 20 may then interact with the shared interactive digital screen. At the same time, when a user at user device 30 has activated the shared interactive digital screen, that user may also view and interact with the shared interactive digital screen. In embodiments, the shared interactive digital screen is configured to allow users on each device to enter data, draw on the screen, or make selections.

Figure 10B:
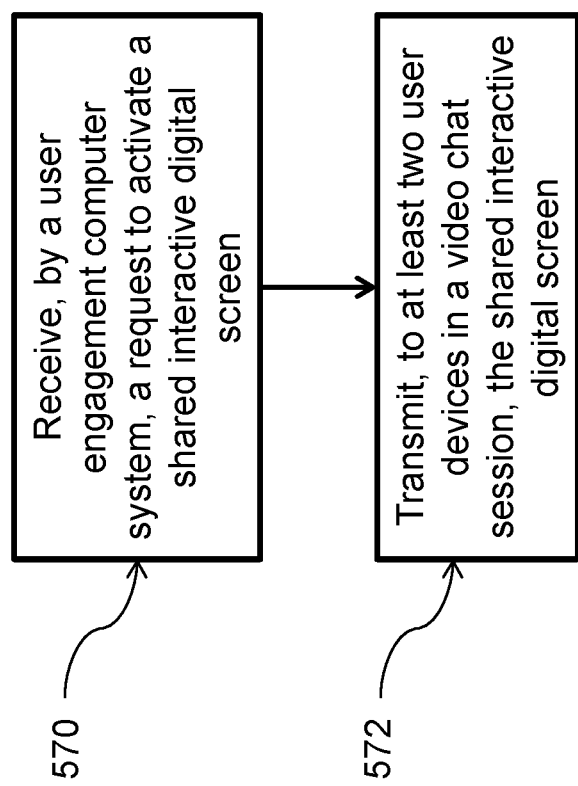
FIG. 10B is a flow chart showing a method for establishing shared digital interactions between user devices using the user engagement computer system in accordance with an embodiment of the present invention.

FIG. 10B shows an exemplary flow chart of steps to be performed by user engagement computer system 10. At step 570, user engagement computer system 10 receives the request for the shared interactive digital screen and, at step 572, shared digital interactions module 64 at user engagement computer system 10 transmits the shared interactive digital screen to all user devices participating in the video chat session that support this functionality. The actions at one user device are then replicated on the shared interactive digital screen to be viewed, substantially in real-time, at the other user devices participating in the video chat session.

As noted above, in embodiments, another use of the shared interactive digital screen on which the single copy of a document or book, such as an e-book, may displayed to two or more participants in the video chat for simultaneous reading.

Thus, in accordance with an embodiment of the present invention, a computer-implemented method provides, via a user engagement computer system, video for an shared interactive digital screen that is displayable as overlaid onto a video chat session between two or more user devices, each having a respective display and associated with a different user. The method includes (a) determining, by the user engagement computer system, whether the video chat session between the two or more user devices is in progress; and (b) transmitting, substantially simultaneously by the user engagement computer system to the two or more user devices upon request by one or more of the two or more user devices during a video chat session that is in progress between the two or more user devices, a shared interactive digital screen for a shared application for substantially simultaneous user interaction across the two or more user devices, wherein the shared interactive digital screen is formatted, by the user engagement computer system, to be displayed during the video chat session as an overlay on top of video of the video chat session on the respective display of the respective user device, upon request at the user device, wherein the overlay is partially transparent and partially opaque, such that the video of the video chat and the shared interactive digital screen are displayed and viewable simultaneously on the same respective display. In embodiments, the shared interactive digital screen is formatted to be displayed with a frosted but transparent background. In embodiments, the shared interactive digital screen is formatted to be displayed with a color scheme or graphics that indicate visually on the respective displays of the two or more user devices the shared interactive digital screen and the video of the video chat session. In embodiments, the shared interactive digital screen is configured to allow users on each of the two or more user devices to enter data, draw on the screen, or make selections. In embodiments, the respective display at at least one of the two or more user devices comprises a touch screen that is used to interact with the shared interactive digital screen.

Enabling Interactive Engagement of User Devices Using Human Behaviors During Video Chat Sessions As noted above, another shortcoming of prior art video chat applications is that the computers generally require users via the user devices to explicitly manipulate a user interface by touching a touch-sensitive screen, using a mouse or keyboard, or by speaking. These computer-implemented applications, however, do not recognize other kinds of human behaviors, such as unspoken sounds and gestural behaviors, which may be subtle like humming, blinking or closing of a user's eyes.

Figure 11A:
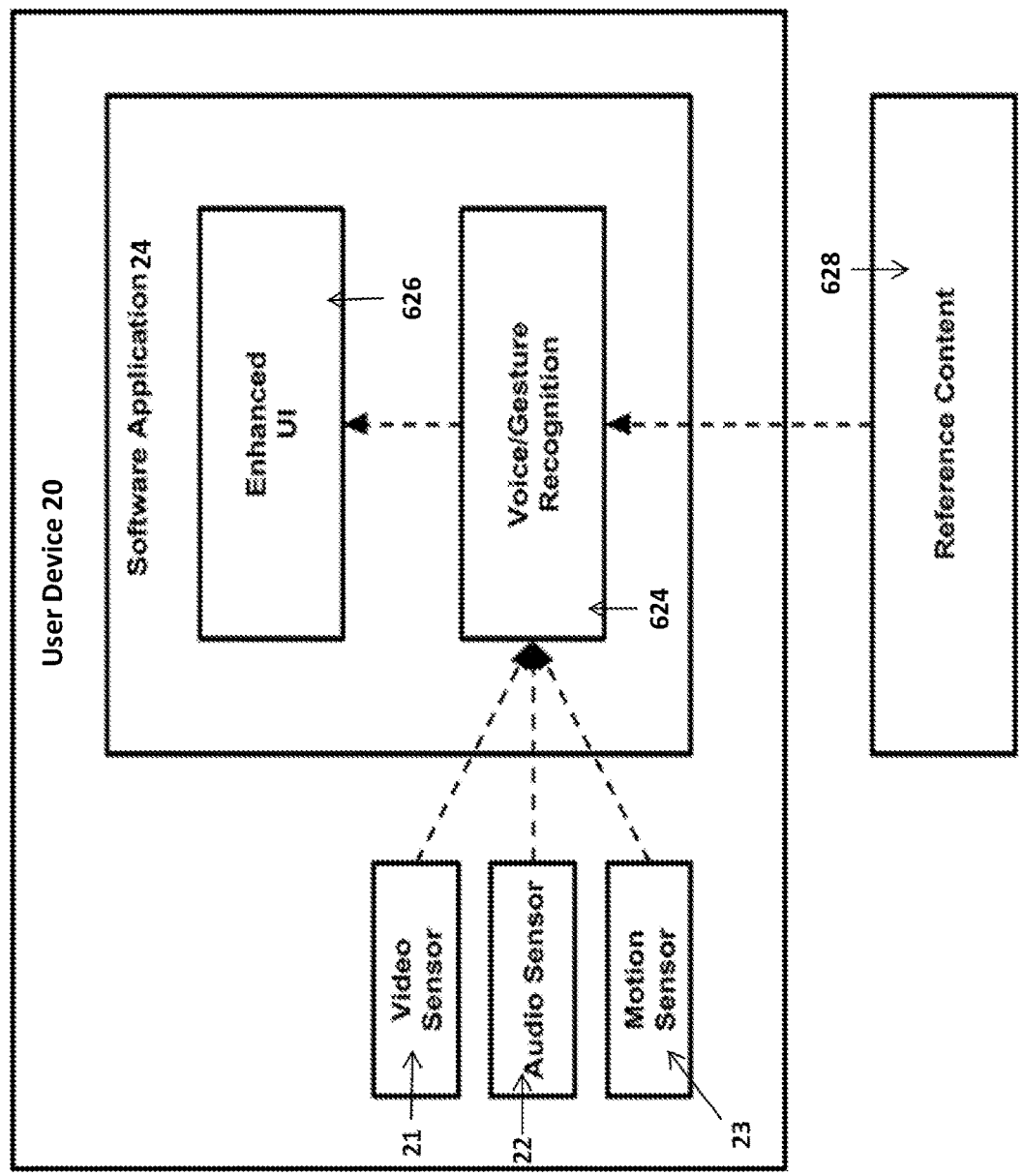
FIG. 11A illustrates a system for enabling interactive engagement between user devices using the user engagement computer system in accordance with an embodiment of the present invention.

Referring to FIG. 11A, a system in an embodiment of the present invention for enabling interactive engagement of user devices using human behaviors includes (1) user engagement computer system 10 that has an interactive engagement module 66 and a content database 628 where the interactive engagement module compares detected unspoken sounds and gestures made by a user with reference content in a content database 628 that is stored in non-transitory computer-readable memory operably connected to the user engagement computer system 10. The content database 628 includes a compilation of audio content and gestural content; and (2) two or more user devices each having a video sensor, audio sensor, motion sensor, and a software application. FIG. 11A illustrates one of the user devices 20 with video sensor 21, audio sensor 22, motion sensor 23, and software application 24. Other user devices participating in the video chat session, such as user device 30, may be similarly equipped. Software application 24 includes a voice and gesture recognition application 624 that interacts with content database 628 to automatically recognize the detected voices and gestures and an enhanced user interface (UI) 626 that allows for use of the audio or gestural commands. Unspoken sounds or gestures made by a user of one user device, for example, at user device 20, may be interpreted as a user command at user device 20 to be performed at user device 20 or another user device with which user device 30 with which user device 20 is participating in a video chat session.

As one example of a gesture to which user engagement computer system 10 may respond is users who individually or collectively keep their eyes closed (a "closed eye state.") Using face detection, user engagement computer system 10 may determine if one or more users at the respective user devices keep their eyes closed. If the users do keep their eyes closed for a predetermined amount of time (e.g., 7 seconds or some other value) and they are not engaged in communication or other interactive activity, or engaged in reduced level of interaction, as determined by monitoring the video sensor, audio sensor, and motion sensor, user engagement computer system 10 will interpret the closed eye state of the one or more users to mean that the users are bored and will initiate games or other relevant experiences like meditation to keep users engaged or to restore user engagement. Where user devices are engaged in playing an interactive game, if user engagement computer system 10 detects via the user devices that one or more of the users have opened an eye from a closed eye state, user engagement computer system 10 may respond by messaging user devices accordingly. For example, user engagement computer system 10 may encourage the users via messages transmitted to user devices to keep their eyes close to prevent them from cheating in a game that requires eyes to be closed.

As another example of a gesture to which user engagement computer system 10 may respond is a user's blow of air into a microphone (audio sensor) at a user device. Via audio detection, user engagement computer system 10 determines that an audible sound corresponds to the user's blowing of air, and, in response, user engagement computer system 10 initiates relevant games/experiences based on the context in which the gesture was made. For example, if a user blows into the microphone of the user device for a sustained approximately 3 seconds, user engagement computer system 10 will display a frost layer, such as a shared interactive digital screen, onto which each user can "draw".

Yet another example of a gesture to which user engagement computer system 10 may respond is to detection by a user device of an associated user singing. User engagement computer system 10 listens to notes sung by the user and may respond by initiating musical accompaniment. Where a user creates a song, user engagement computer system 10 is configured to determine the key at which the user is singing and providing a chord that automatically supports the notes that are sung, thus creating a pleasing sonic arrangement. User engagement computer system 10 may also ingest lyrics and melodies, may use audio recognition to recognize the songs to which the lyrics and melodies belong and play the correct chords supporting the melody sung by the user. In embodiments, the song sung by the user and detected by the user device corresponds to a popular children's song.

Figure 11B:
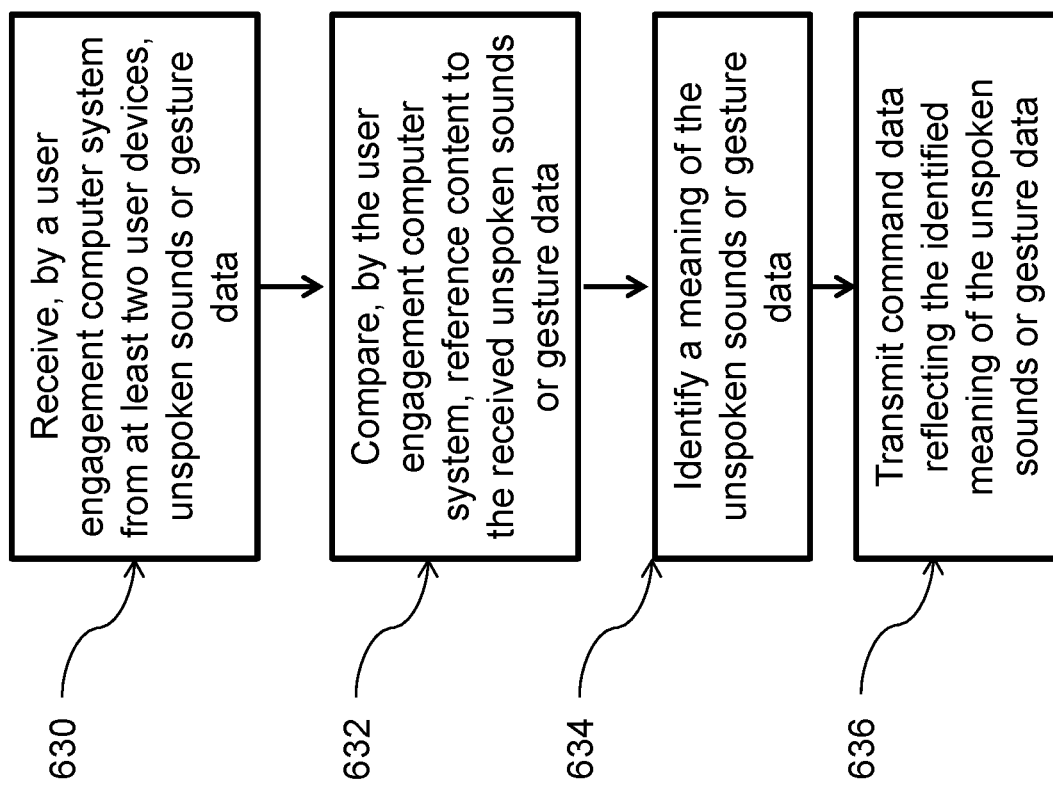
FIG. 11B is a flow chart showing a method for enabling interactive engagement in accordance with an embodiment of the present invention.

FIG. 11B shows a flow chart that shows exemplary steps for an algorithm for performing interactive engagement using unspoken sounds and gestures in accordance with an embodiment of the present invention. When this feature is turned on, at step 630, user engagement computer system 10 receives data from user device 20 or 30 that reflects unspoken sounds or gestures made by a user as detected by video sensor 21 or 31 and/or audio sensor 22 or 32 and compares the received sounds or gestures against sounds or gestures in content database 628. At step 632, user engagement computer system 10 performs audio/gesture recognition using interactive engagement module 66 to try to identify the command(s) intended by the user's sounds or gestures based on a match of sounds or gestures in content database 628, where the match achieves a confidence score that reflects how closely the detected sounds/gestures match the defined sound and gesture commands in content database 628. If a match is found with high enough confidence, at step 634 the relevant command indicated by the non-spoken sound(s) or gesture(s) is transmitted to the user device that detected the sounds or gestures.

Thus, in accordance with an embodiment of the present invention, a computer-implemented method is provided for interactive engagement by two or more user devices, each associated with a different user, with a user engagement computer system that is in communication with the two or more user devices, wherein the two or more user devices each has a respective audio sensor, a respective video sensor, and a respective motion sensor. The method includes the steps of: (a) detecting, by the user engagement computer system using outputs from the respective motion sensors, a facial gestural input comprising a closed eye state by one or more of the respective users of the two or more user devices for a predetermined period of time; and (b) initiating, by the user engagement computer system, an automated action to further engage at least one of the different users in response to the facial gestural input, wherein the automated action comprises (i) starting, at a time of reduced interaction or no other user interaction between the two or more user devices, one of an interactive game or a meditation session; or (ii) transmitting a verbal communication to one or more of the two or more user devices. In embodiments, the method in accordance with the present invention is performed by the user engagement computer system during a video chat session between the two or more user devices.

In accordance with another embodiment of the present invention, a computer-implemented method is provided for interactive engagement by two or more user devices, each associated with a different user, with a user engagement computer system that is in communication with the two or more user devices, wherein the two or more user devices each has a respective audio sensor, a respective video sensor, and a respective motion sensor. The method includes the steps of: (a) detecting, by the user engagement computer system using outputs from the respective audio sensors, a gestural input comprising blowing of air by a respective user of one of the two or more user devices into a microphone at the respective user device; and (b) initiating, by the user engagement computer system, an automated action to further engage at least one of the different users in response to the gestural input comprising the user's blowing of air. In embodiments, the method is performed by the user engagement computer system during a video chat session between the two or more user devices. In embodiments, the automated action that is performed during the video chat session comprises activating an shared interactive digital screen that is displayable as overlaid onto the video chat session between the two or more user devices, In accordance with another embodiment of the present invention, a computer-implemented method is provided for interactive engagement by at least one user devices, associated with a user, with a user engagement computer system that is in communication with the user device, wherein the user device has an audio sensor, a video sensor, and a motion sensor. The method includes the steps of: (a) detecting, by the user engagement computer system based on audio data received from the audio sensor, that a song is being sung by the user associated with the user device by comparing the received audio data with reference content in a content database that is stored in non-transitory computer-readable memory operably connected to the user engagement computer system, the content database comprising a compilation of song content; and (b) automatically initiating, by the user engagement computer system, musical accompaniment comprising chords to be played by the user device while the song is detected at the user device.

Now that embodiments of the present invention have been shown and described in detail, various modifications and improvements thereon will become readily apparent to those skilled in the art. Accordingly, the spirit and scope of the present invention is to be construed broadly and not limited by the foregoing specification.

What is claimed is:

1. A computer-implemented method for interactive engagement by two or more user devices, each associated with a different user, with a user engagement computer system that is in communication with the two or more user devices, wherein the two or more user devices each has a respective audio sensor, a respective video sensor, and a respective motion sensor, the method comprising:
   (a) detecting, by the user engagement computer system during a video chat session comprising substantially simultaneous presentation of audio and video between the two or more user devices using outputs from at least one of the respective audio sensors, the respective video sensors, and the respective motion sensors, a gestural input by one or more of the respective users of the two or more user devices;
   (b) in response to detecting the gestural input, determining, during the video chat session by the user engagement system, that the detected gestural input matches gestural content stored in a content database, wherein the match is based on a confidence score that reflects how closely the detected gestural input matches the stored gestural content; and
   (c) transmitting, by the user engagement system to the one or more of the respective users of the two or more user devices, a command corresponding to the matched stored gestural content, wherein the command initiates an automated action to further engage at least one of the respective users.

2. The method of claim 1, wherein the gestural input comprises a facial gestural input and the at least one of the respective audio sensors, the respective video sensors, and the respective motion sensors comprises the respective motion sensors.

3. The method of claim 1, wherein the gestural input comprises blowing of air by a respective user of one of the two or more user devices into a microphone at the respective user device and the at least one of the respective audio sensors, the respective video sensors and the respective motion sensors comprises the respective audio sensors.

4. The method of claim 1, wherein the automated action that is performed during the video chat session comprises activating a shared interactive digital screen that is displayable as overlaid onto the video of the video chat session between the two or more user devices.

* * * * *